United States Patent
Lei et al.

(10) Patent No.: US 12,432,528 B2
(45) Date of Patent: Sep. 30, 2025

(54) SIGNALING RELATED TO DYNAMIC SPECTRUM SHARING CARRIER

(71) Applicant: QUALCOMM Incorporated, San Diego, CA (US)

(72) Inventors: Jing Lei, San Diego, CA (US); Kazuki Takeda, Tokyo (JP); Huilin Xu, Temecula, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 17/650,548

(22) Filed: Feb. 10, 2022

(65) Prior Publication Data
US 2022/0256315 A1  Aug. 11, 2022

Related U.S. Application Data

(60) Provisional application No. 63/148,592, filed on Feb. 11, 2021.

(51) Int. Cl.
| | |
|---|---|
| *H04W 4/06* | (2009.01) |
| *H04L 1/1607* | (2023.01) |
| *H04L 5/00* | (2006.01) |
| *H04W 72/1263* | (2023.01) |
| *H04W 72/20* | (2023.01) |

(52) U.S. Cl.
CPC .............. *H04W 4/06* (2013.01); *H04L 1/1642* (2013.01); *H04L 5/0051* (2013.01); *H04W 72/1263* (2013.01); *H04W 72/20* (2023.01)

(58) Field of Classification Search
CPC ... H04W 4/06; H04W 72/1263; H04W 72/20; H04W 88/06; H04L 1/1642; H04L 5/0051
See application file for complete search history.

(56) References Cited

U.S. PATENT DOCUMENTS

| | | | |
|---|---|---|---|
| 2020/0351987 A1* | 11/2020 | Gheorghiu | H04W 24/10 |
| 2022/0124511 A1* | 4/2022 | Kim | H04W 76/28 |
| 2022/0311576 A1* | 9/2022 | Sun | H04L 27/2602 |
| 2022/0322130 A1* | 10/2022 | Muruganathan | H04L 5/005 |
| 2023/0020414 A1* | 1/2023 | Harada | H04W 72/12 |

(Continued)

FOREIGN PATENT DOCUMENTS

WO    2020261095 A1    12/2020

OTHER PUBLICATIONS

U.S. Appl. No. 62/986,103 Priority document for US 20230239705 Mar. 2020 (Year: 2020).*

(Continued)

*Primary Examiner* — Rina C Pancholi
(74) *Attorney, Agent, or Firm* — Muncy, Grissler, Olds & Lowe PC

(57) ABSTRACT

Disclosed are techniques for wireless communication. In an aspect, a UE transmits a DSS capability indication to a network entity (e.g., base station), which determines scheduling information for resources of a DSS carrier based on the DSS capability indication. In another aspect, a BS transmits RAT-specific (e.g., LTE-specific) information associated with a DL RS (e.g., LTE CRS) to a UE, which processes the DL RS on a DSS carrier based at least in part on the RAT-specific information.

10 Claims, 22 Drawing Sheets

(56) References Cited

U.S. PATENT DOCUMENTS

2023/0239705 A1* 7/2023 Gronstad ................ H04W 8/24
370/329

OTHER PUBLICATIONS

Maximov et al. 5G NR and 4G LTE coexistence—Mediatek NPL # 2 in IDS Jul. 15, 2022 Mar. 2020 (Year: 2020).*
International Search Report and Written Opinion—PCT/US2022/070624—ISA/EPO—May 6, 2022.
Maximov Sergey: "5G NR and 4G LTE Coexistence a Comprehensive Deployment Guide to Dynamic Spectrum Sharing", Mediatek, Mar. 3, 2020 (Mar. 3, 2020), pp. 1-30, XP055818385, pp. 2-30.
Moderaor,(NTT Docomo, Inc.)"Summary on 101-e-NR-UEFeatures-TEis-02]",3GPP Draft,3GPP TSG RAN WG1 #101,R1-2004827,3rd Gen Partnership Project(3GPP)Mobile Competence Centre,650, Route Des Lucioles,F-06921 Sophia-Antipolis Cedex,FR, vol. RAN WG1,No. e-Mtg,May 25, 2020-Jun. 5, 2020,Jun. 4, 2020(Jun. 4, 2020),XP051893280, 26 Pages, Retrieved from the Internet: URL: https://ftp.3gpp.org/tsg_ran/WG1_RL1/TSGR1_101-e/Docs/R1-2004827.zip R1-2004827_Summary on 101-e-NR-UE-Features-TEis-02_final.docx [Retrieved Jun. 4, 2020] sections 1-3,Appendix.

* cited by examiner

SIGNALING RELATED TO DYNAMIC SPECTRUM SHARING CARRIER

CROSS-REFERENCE TO RELATED APPLICATIONS

The present application for patent claims the benefit of U.S. Provisional Application No. 63/148,592, entitled "SIGNALING RELATED TO DYNAMIC SPECTRUM SHARING CARRIER," filed Feb. 11, 2021, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes transmitting, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receiving, from the network entity, scheduling information for resources on the DSS carrier based at least in part upon the DSS capability indication.

In an aspect, a method of operating a network entity includes receiving, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmitting scheduling information for resources on the DSS carrier based at least in part upon the DSS capability indication.

In an aspect, a method of operating a user equipment (UE) includes receiving, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and processing the second RAT DL RS based at least in part on the information.

In an aspect, a method of operating a network entity includes determining information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmitting the information to the UE.

In an aspect, a user equipment (UE) includes a memory; at least one transceiver; and at least one processor communicatively coupled to the memory and the at least one transceiver, the at least one processor configured to: transmit, via the at least one transceiver, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receive, via the at least one transceiver, from the network entity, scheduling information for resources on the DSS carrier based at least in part upon the DSS capability indication.

In an aspect, a network entity includes a memory; at least one transceiver; and at least one processor communicatively coupled to the memory and the at least one transceiver, the at least one processor configured to: receive, via the at least one transceiver, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmit, via the at least one transceiver, scheduling information for resources on the DSS carrier based at least in part upon the DSS capability indication.

In an aspect, an UE includes a memory; at least one transceiver; and at least one processor communicatively coupled to the memory and the at least one transceiver, the at least one processor configured to: receive, via the at least one transceiver, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and process the second RAT DL RS based at least in part on the information.

In an aspect, a network entity includes a memory; at least one transceiver; and at least one processor communicatively coupled to the memory and the at least one transceiver, the at least one processor configured to: determine information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmit, via the at least one transceiver, the information to the UE.

In an aspect, a user equipment (UE) includes means for transmitting, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and means for receiving, from the network entity, scheduling information for resources on the DSS carrier based at least in part upon the DSS capability indication.

In an aspect, a network entity includes means for receiving, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and means for transmitting scheduling information for resources on the DSS carrier based at least in part upon the DSS capability indication.

In an aspect, an UE includes means for receiving, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and means for processing the second RAT DL RS based at least in part on the information.

In an aspect, a network entity includes means for determining information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and means for transmitting the information to the UE.

In an aspect, a non-transitory computer-readable medium storing computer-executable instructions that, when executed by a user equipment (UE), cause the UE to: transmit, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receive, from the network entity, scheduling information for resources on the DSS carrier based at least in part upon the DSS capability indication.

In an aspect, a non-transitory computer-readable medium storing computer-executable instructions that, when executed by a network entity, cause the network entity to: receive, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmit scheduling information for resources on the DSS carrier based at least in part upon the DSS capability indication.

In an aspect, a non-transitory computer-readable medium storing computer-executable instructions that, when executed by an UE, cause the UE to: receive, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and process the second RAT DL RS based at least in part on the information.

In an aspect, a non-transitory computer-readable medium storing computer-executable instructions that, when executed by a network entity, cause the network entity to: determine information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmit the information to the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
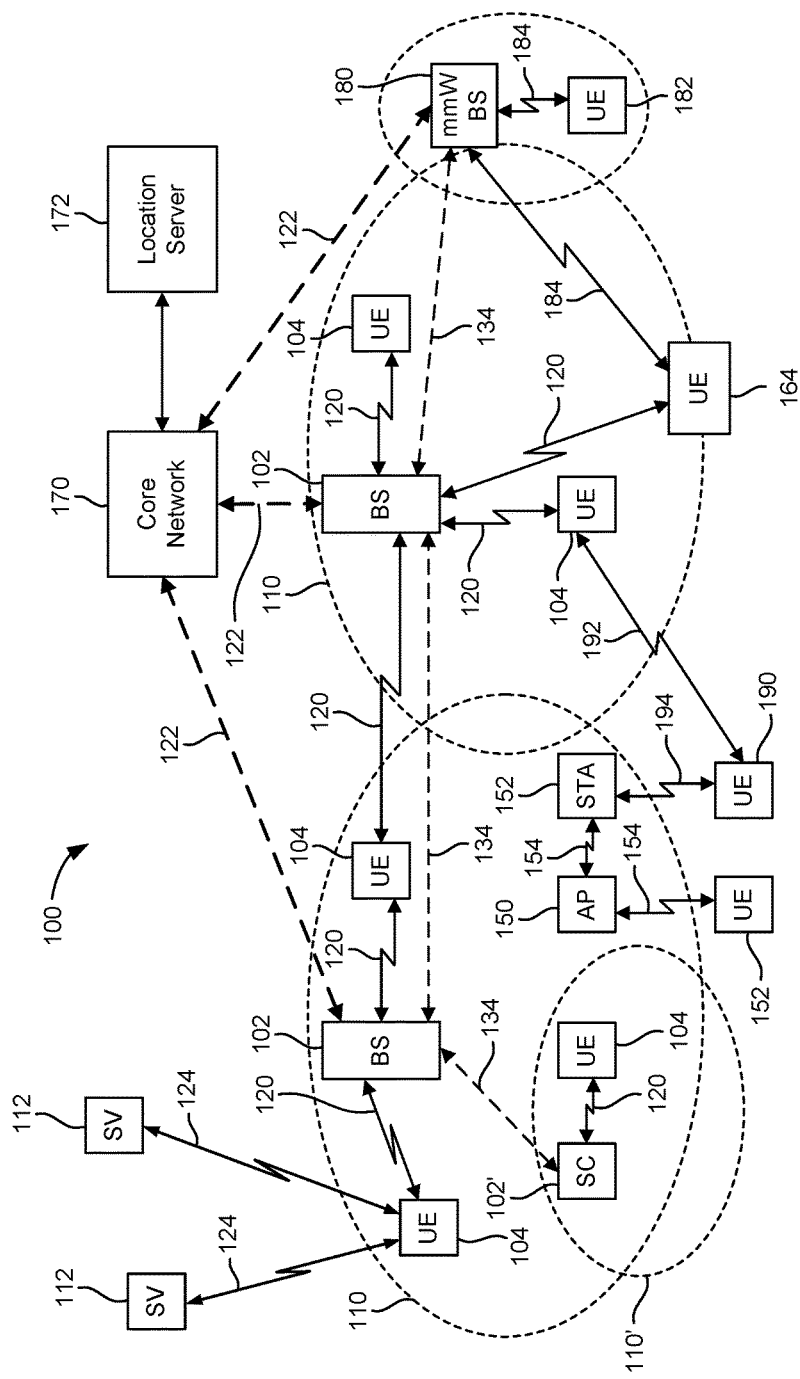
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
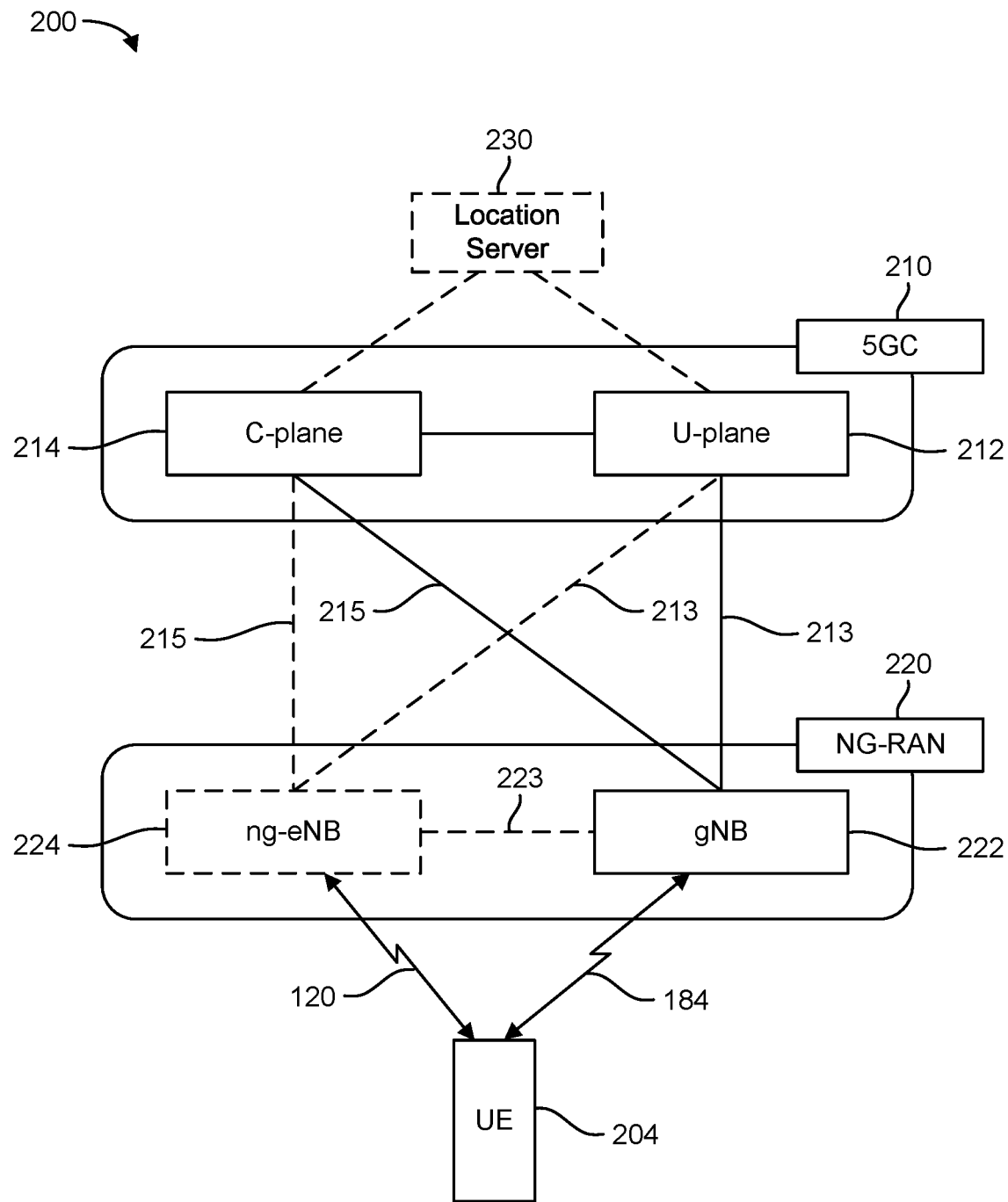
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
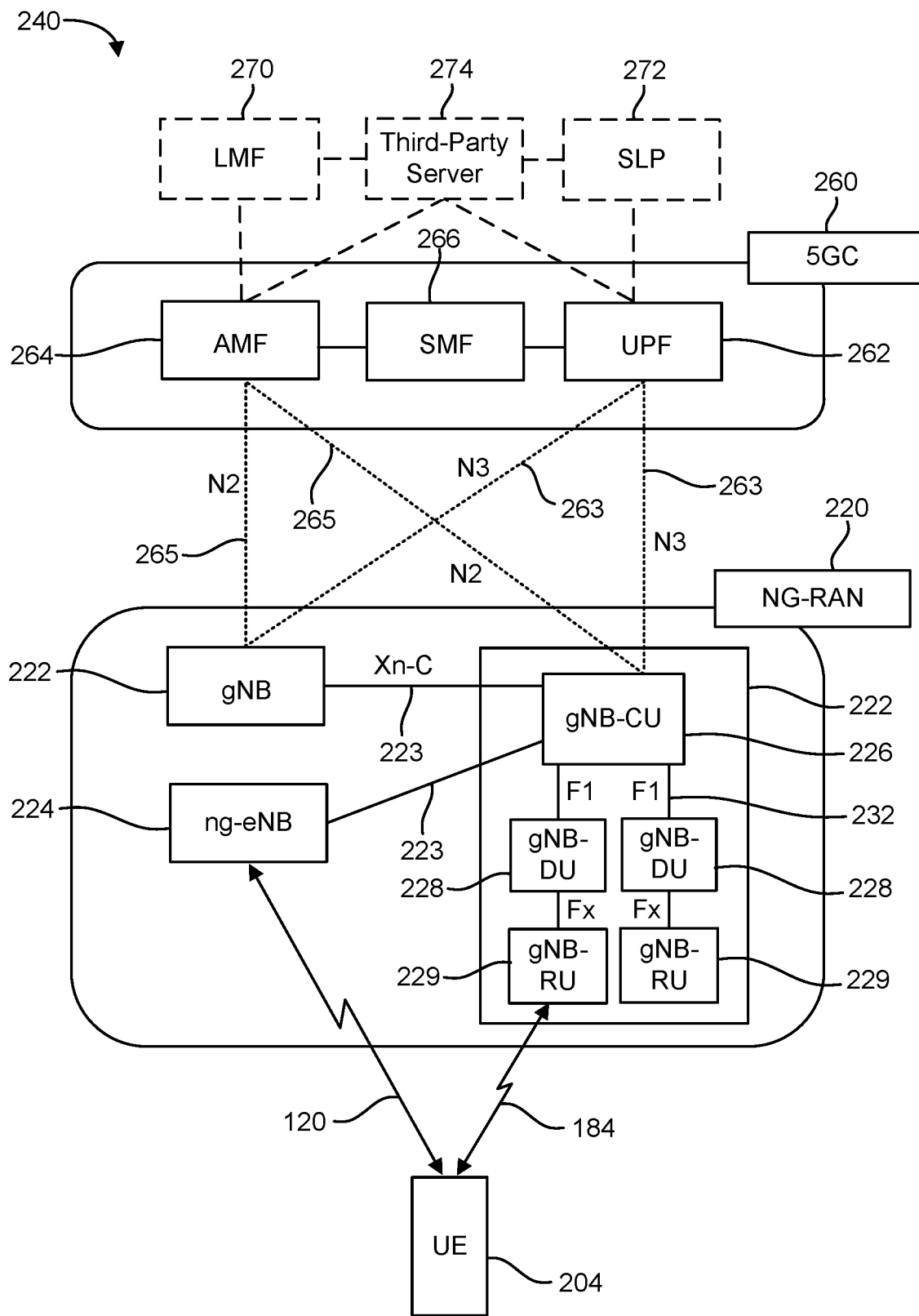

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
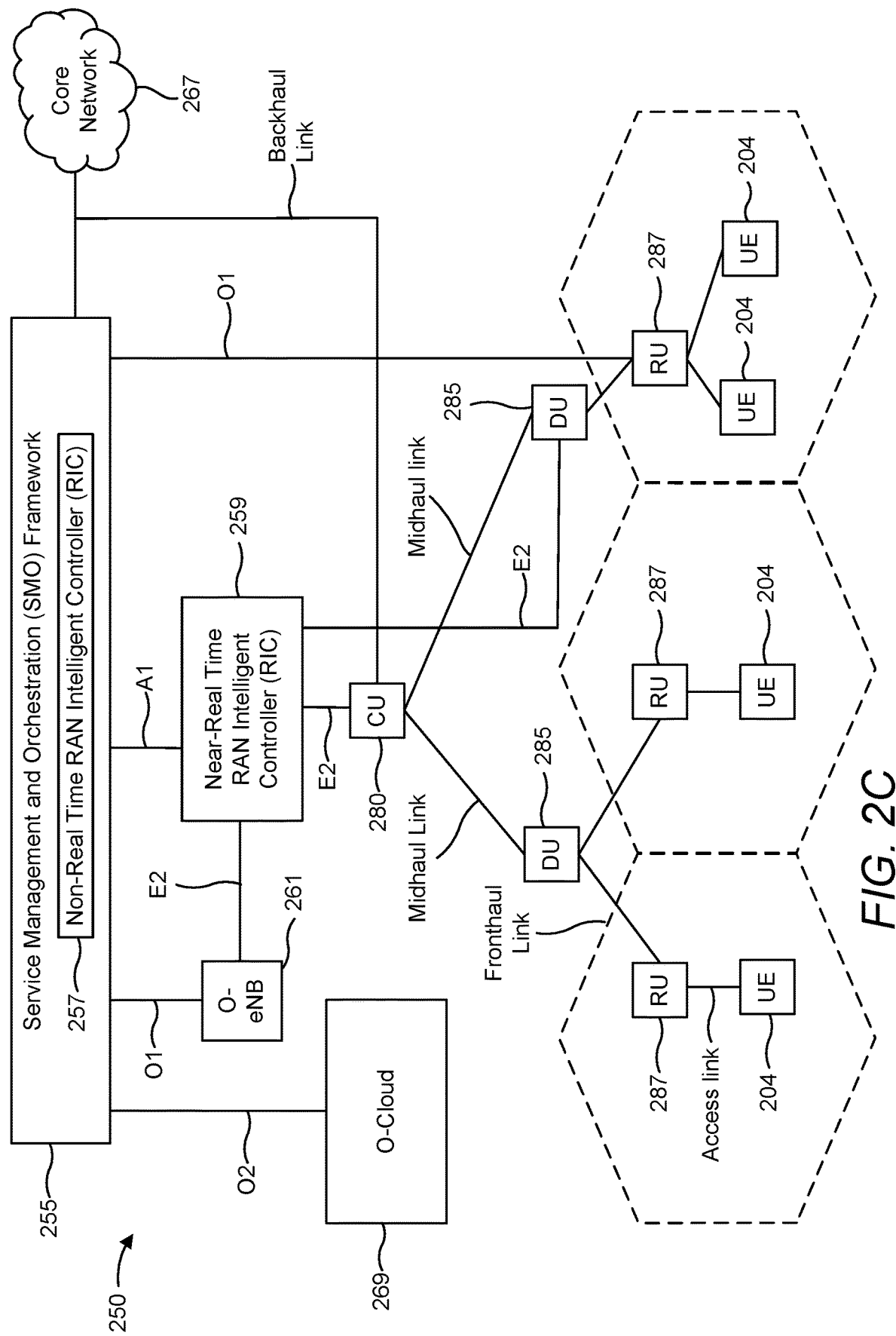

FIG. 2C is a diagram 250 illustrating an example disaggregated base station architecture, according to aspects of the disclosure. The disaggregated base station 250 architecture may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (MC) 259 via an E2 link, or a Non-Real Time (Non-RT) MC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT MC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT MC 259 may be configured to tune RAN behavior or performance. For example, the Non-RT MC 257 may monitor long-term trends and patterns for performance and employ AI/ML models to perform corrective actions through the SMO Framework 255 (such as reconfiguration via 01) or via creation of RAN management policies (such as AI policies).

Figure 3A:
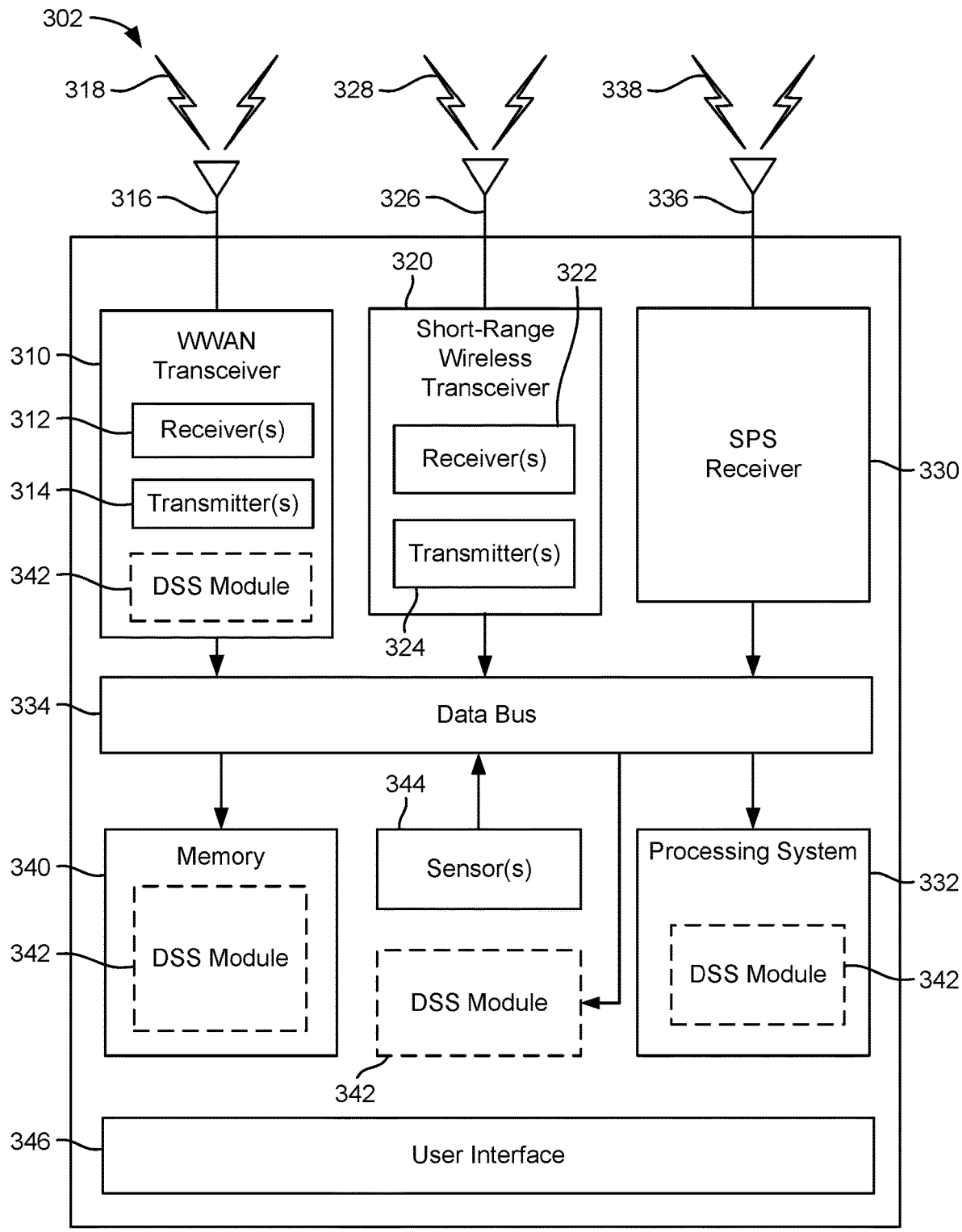
FIGS. 3A to 3C are simplified block diagrams of several sample aspects of components that may be employed in a user equipment (UE), a base station, and a network entity, respectively, and configured to support communications as taught herein.
Figure 3B:
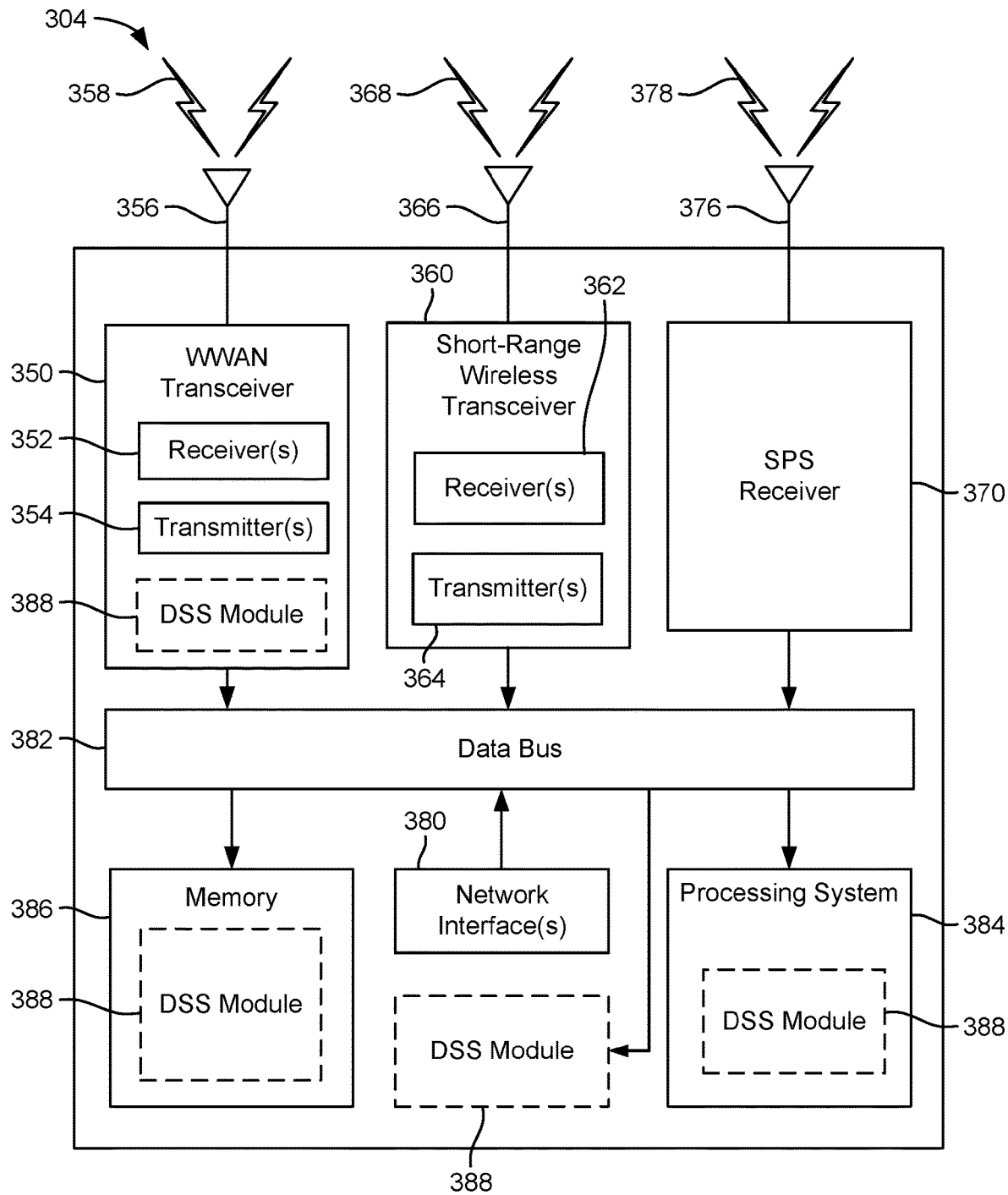
Figure 3C:
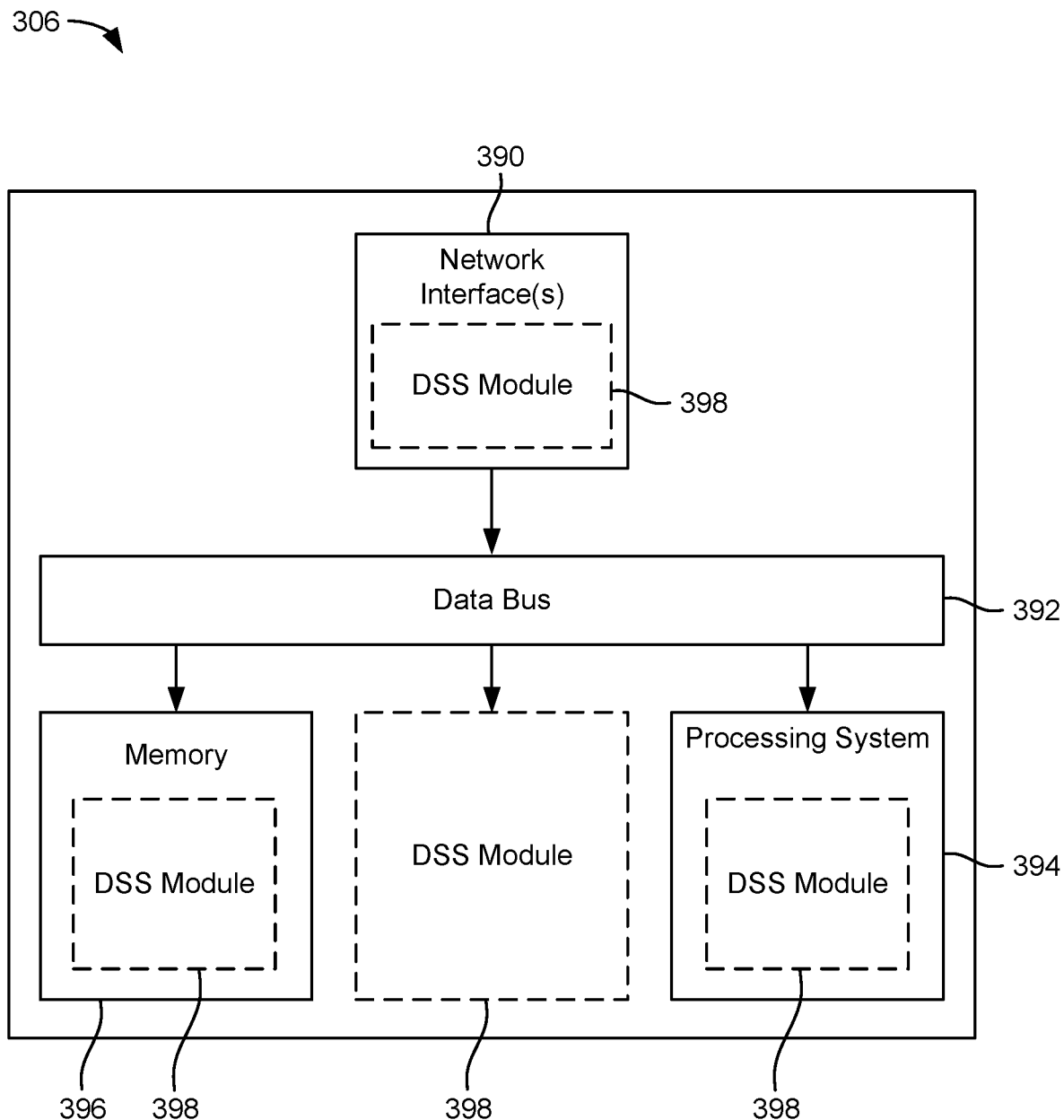

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include Dynamic Spectrum Sharing (DSS) Modules 342, 388, and 398, respectively. The DSS Modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the DSS Modules 342, 388, and 398 may be external to the processing systems 332, 384, and 394 (e.g., part of a modem processing system, integrated with another processing system, etc.). Alternatively, the DSS Modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the DSS Module 342, which may be part of the WWAN transceiver 310, the memory component 340, the processing system 332, or any combination thereof, or may be a standalone component. FIG. 3B illustrates possible locations of the DSS Module 388, which may be part of the WWAN transceiver 350, the memory component 386, the processing system 384, or any combination thereof, or may be a standalone component. FIG. 3C illustrates possible locations of the DSS Module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the DSS Modules 342, 388, and 398, etc.

Figure 4A:
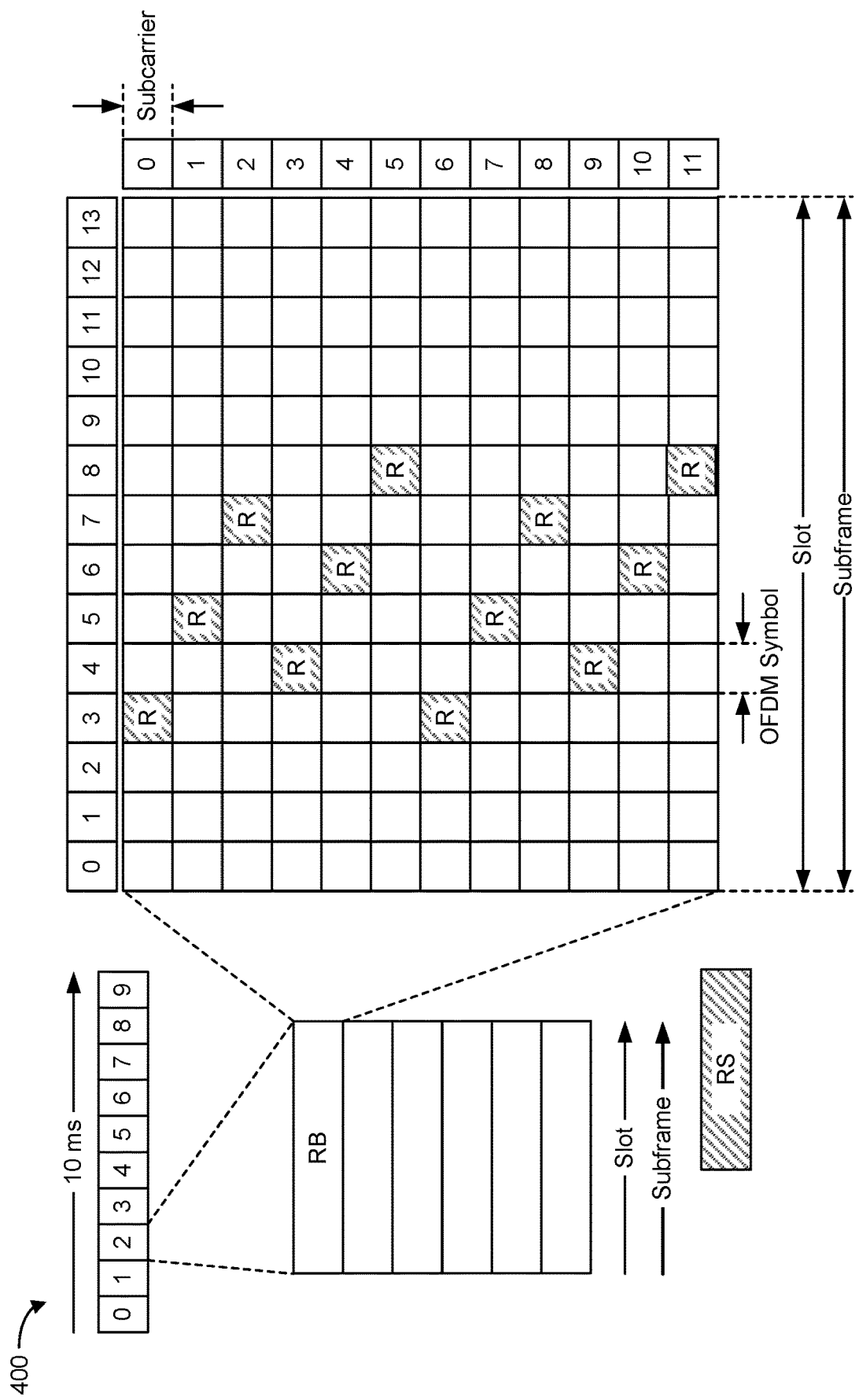
FIGS. 4A to 4D are diagrams illustrating example frame structures and channels within the frame structures, according to aspects of the disclosure.
Figure 4B:
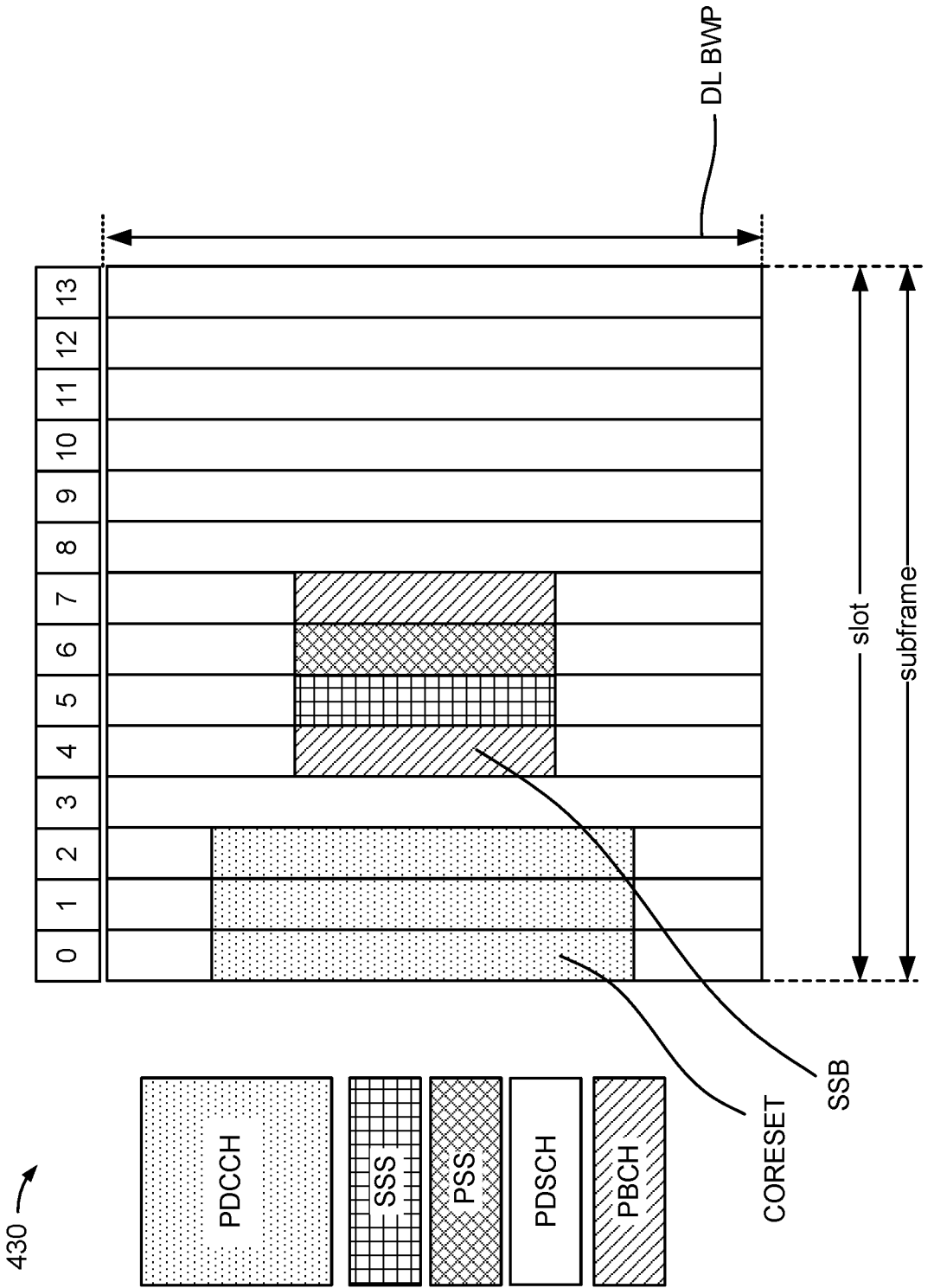
Figure 4C:
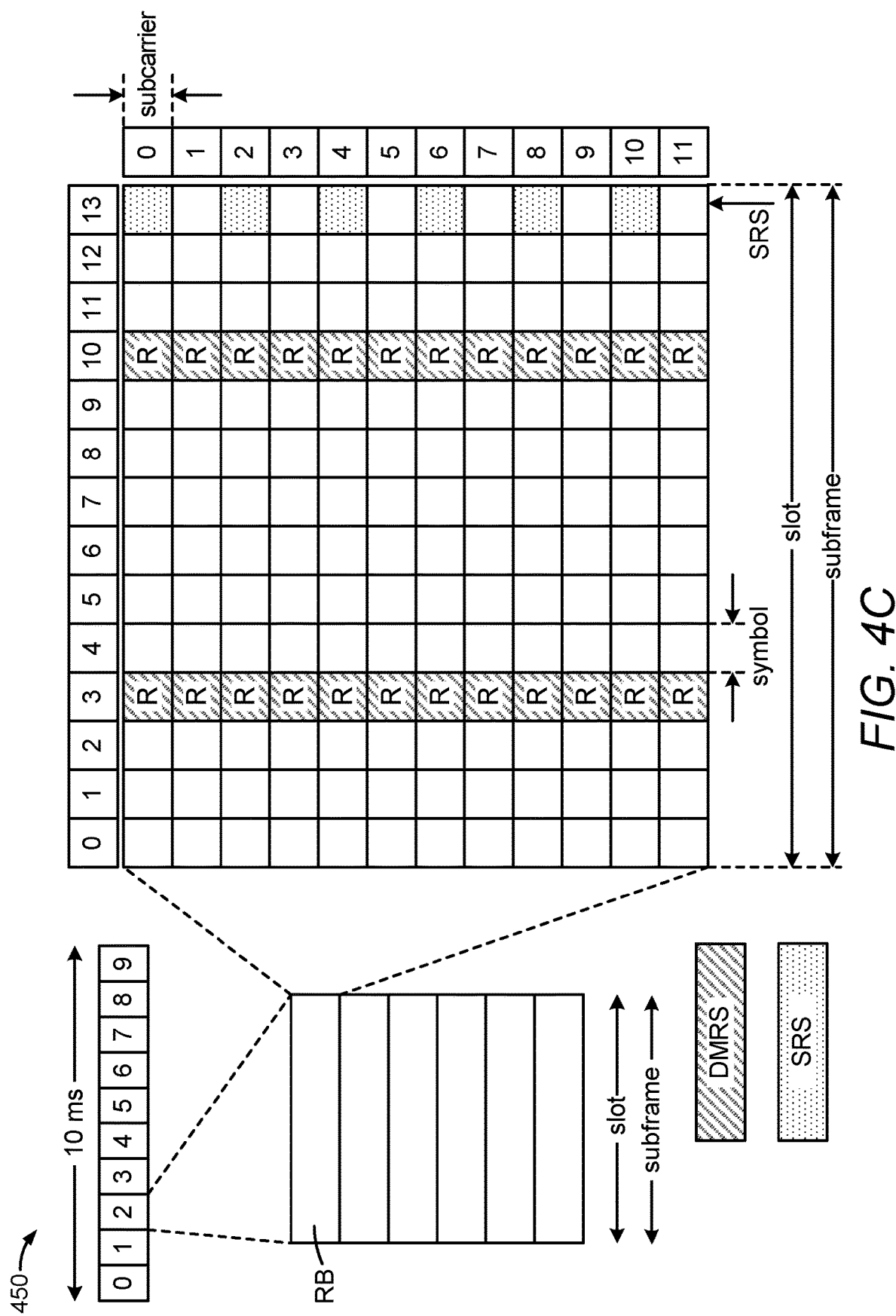
Figure 4D:
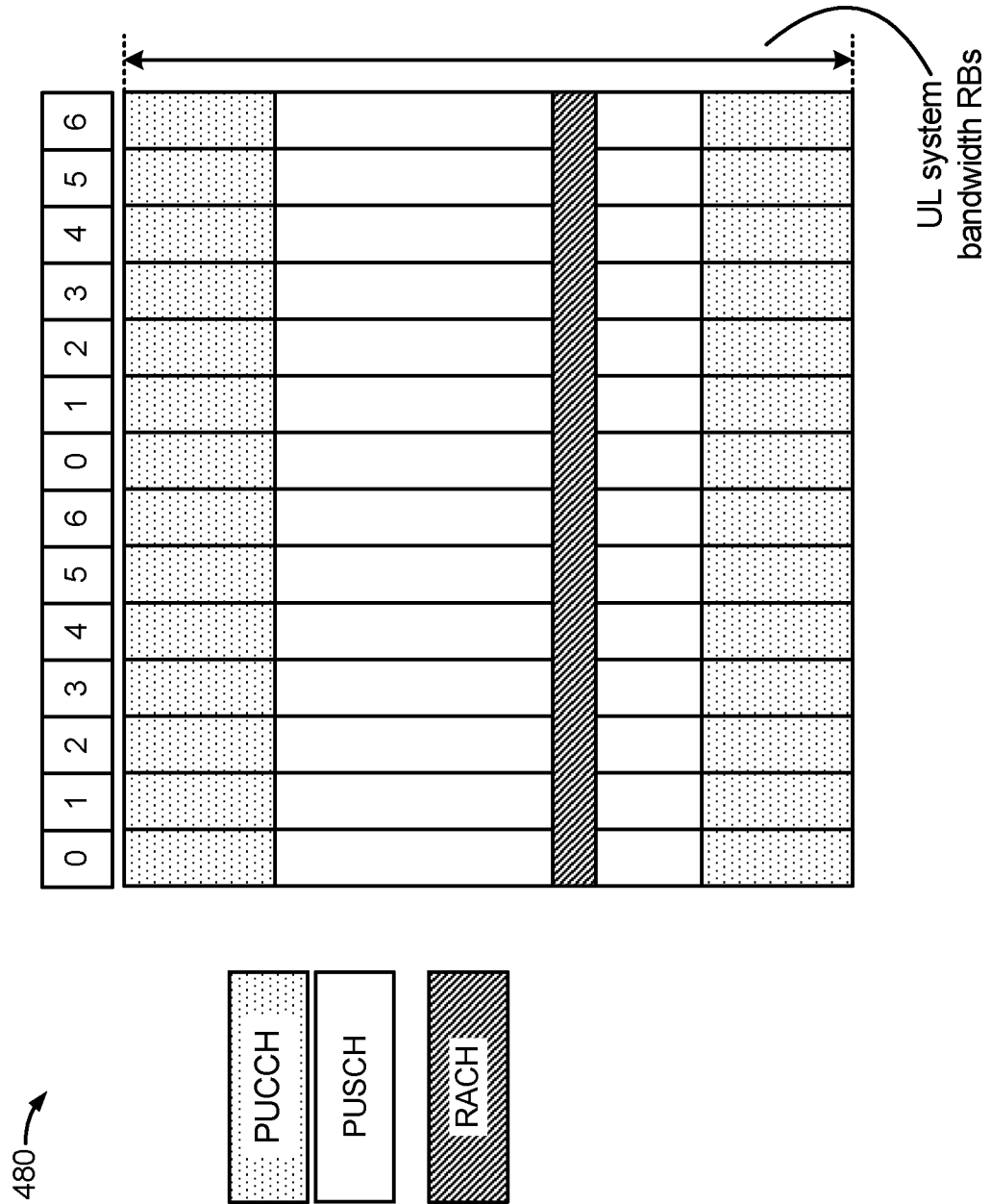

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying RS (labeled "R").

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: $\{0\}$; 2-symbol comb-2: $\{0, 1\}$; 4-symbol comb-2: $\{0, 1, 0, 1\}$; 4-symbol comb-4: $\{0, 2, 1, 3\}$; 8-symbol comb-4: $\{0, 2, 1, 3, 0, 2, 1, 3\}$; 12-symbol comb-4: $\{0, 2, 1, 3, 0, 2, 1, 3, 0, 2, 1, 3\}$; 4-symbol comb-8: $\{0, 4, 2, 6\}$; 8-symbol comb-8: $\{0, 4, 2, 6, 1, 5, 3, 7\}$; and 12-symbol comb-8: $\{0, 4, 2, 6, 1, 5, 3, 7, 0, 4, 2, 6\}$.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc.

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI. For signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Dynamic spectrum sharing (DSS) provides a useful migration path from LTE to NR by allowing LTE and NR to share the same carrier. DSS was included already in 3GPP Rel. 15 and further enhanced in 3GPP Rel. 16. As the number of NR devices in a network increases, it is important that sufficient scheduling capacity for NR UEs on the shared carriers (or DSS carriers) is ensured.

As noted above, various device types may be characterized as UEs. Starting in 3GPP Rel. 17, a number of these UE types (so-called low-tier UEs) are being allocated a new UE classification denoted as Reduced Capability ('RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on. RedCap UEs are generally associated with lower complexity and lower cost relative to other UE types (e.g., high end eMBB and URLLC devices), LTE provides always-on CRS that is accessible to UEs in both RRC-Connected mode and RRC-Idle mode. A UE in LTE RRC-Idle mode may use CRS for channel estimation, downlink synchronization, RRM measurement and positioning, and so on. In comparison to LTE, NR has fewer resources for UEs in NR RRC-Idle or NR RRC-Inactive modes. In some designs, UEs in NR RRC-Idle or NR RRC-Inactive modes may only monitor SSB, and CRS is not transmitted at all. In some designs, SSB is transmitted in limited bandwidth with only 20 RBs, and normally with sparse periodicity (e.g., 20 ms). In some designs, other reference signals such as CSI-RS, TRS, PTRS, PRS, etc. are only available to UEs in NR RRC-Idle or NR RRC-Inactive modes upon transition into NR RRC-Connected mode based on UE-specific configuration. For this reason, operation in NR RRC-Idle or NR RRC-Inactive modes has less flexibility and worse performance than LTE RRC-Idle mode (e.g., more latency, more power consumption at UE, etc.), although the NR network may save power by not transmitting CRS.

Figure 5A:
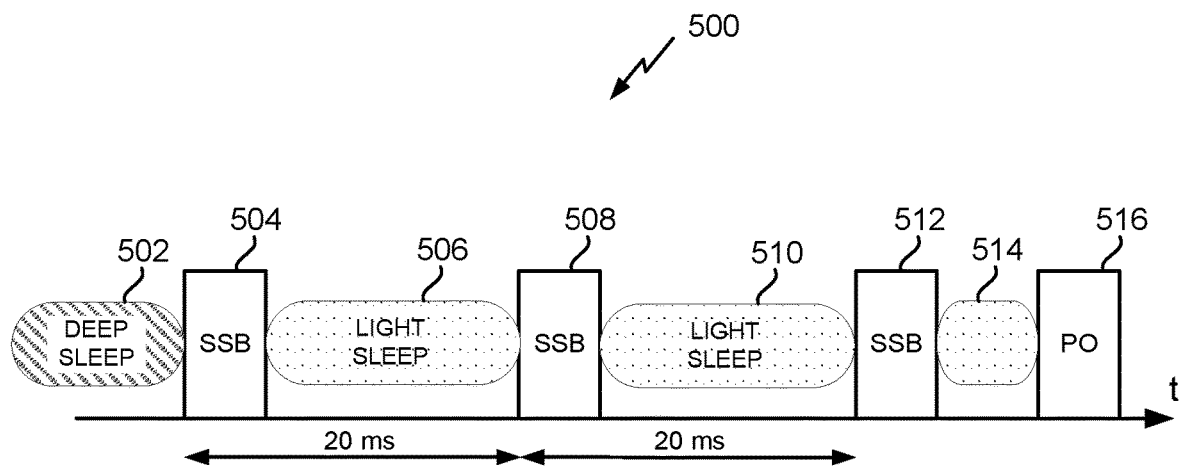
FIG. 5A illustrates an NR wake-up procedure of a UE in accordance with an aspect of the disclosure.

FIG. 5A illustrates an NR wake-up procedure 500 of a UE in accordance with an aspect of the disclosure. At 502, the UE is in deep sleep while in NR RRC-Idle or NR RRC-Inactive mode. At 504, the UE monitors a first SSB. At 506, the UE is now in a light sleep mode. At 508, the UE monitors a second SSB, and then returns to light sleep mode at 510. At 512, the UE monitors a third SSB, and then returns to light sleep mode at 514. At this point, the UE has obtained sufficient synchronization to monitor a paging opportunity (PO) at 516.

Figure 5B:
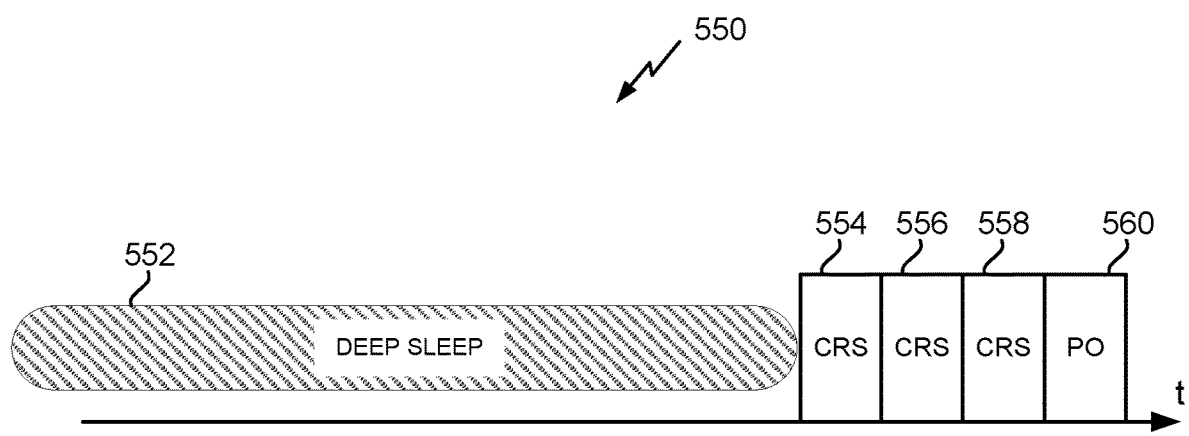
FIG. 5B illustrates an LTE wake-up procedure of a UE in accordance with an aspect of the disclosure.

FIG. 5B illustrates an LTE wake-up procedure 550 of a UE in accordance with an aspect of the disclosure. At 552, the UE is in deep sleep while in LTE RRC-Idle mode. At 554, the UE monitors a first CRS. Unlike SSBs, CRSs are transmitted continuously such that the 20 ms light sleep mode gaps between successive CRS measurements are not needed. Hence, at 556, the UE monitors a second CRS, and at 558, the UE monitors a third CRS. At this point, the UE has obtained sufficient synchronization to monitor a PO at 560.

RedCap UEs may be required to support TDD, FDD and Type-A HD-FDD in FR1. In some designs, RedCap UEs may be configured with a compact form factor, which limits the number of TX/RX antennas as well as the size of such antennas. Measurement accuracy of RedCap UEs may be degraded as a consequence of reduced number of RX antennas and reduced antenna efficiency.

Aspects of the disclosure relate to signaling related to DSS carriers. For example, the signaling may include a DSS capability indication that may be used to scheduled resources on a DSS carrier (e.g., in some systems, the network simply assumes that all UEs have sufficient DSS capability, and such an assumption can be incorrect for some UE types such as RedCap UEs for the reasons noted above). In another example, the signaling may include information associated with a second radio access technology (RAT) (e.g., LTE) downlink (DL) reference signal (RS) (e.g., LTE CRS) QCLed with first RAT (e.g., NR) signaling on a DSS carrier, which can be used in various ways. Such aspects may provide various technical advantages, especially with respect to RedCap UEs, although some or all of these technical advantages may also be applicable to other UE types. For example, from a propagation perspective, DSS carriers (e.g., FDD band n3, n5 or TDD band n41) may have less attenuation loss than the carriers dedicated to the first RAT (e.g., NR, particularly in component carriers at 3 GHz or higher). In another example, on the DSS carriers, the time/frequency resources available for the first RAT (e.g., NR) are sufficient to support SA deployment of RedCap UEs with reduced data rate requirements and relaxed latency requirements. In another example, the second RAT DL RS (e.g., always-on LTE CRS) on DSS carriers may provide more measurement opportunities for RedCap UEs, which can be used to compensate for the reduced number of RX antennas and/or reduced antenna efficiency of RedCap UE. In another example, on the network side, the signaling overhead for TRS or CSI-RS can be reduced on DSS carriers. In another example, on UE side, improved measurement accuracy can be achieved for time/frequency tracking, power control, positioning, and/or RLM/RRM.

Figure 6:
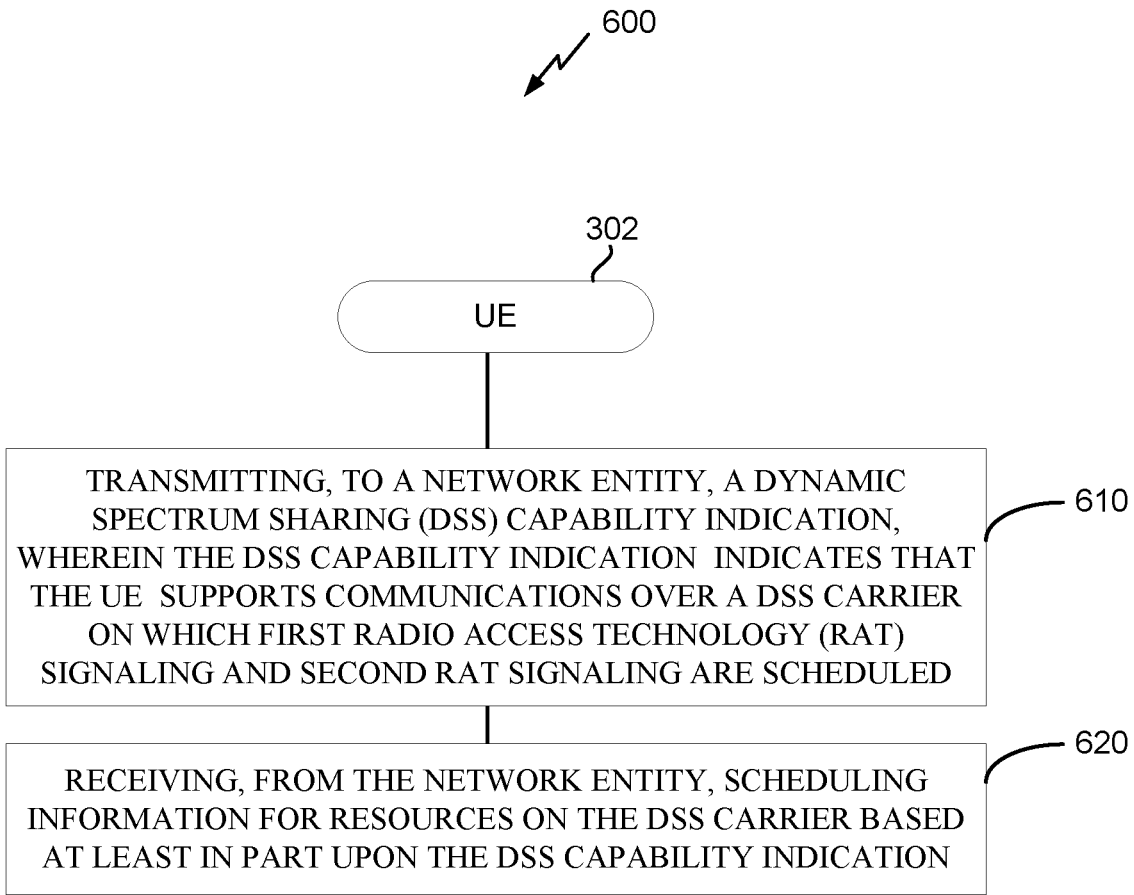
FIG. 6 illustrates an exemplary process of wireless communication, according to aspects of the disclosure.

FIG. 6 illustrates an exemplary process 600 of wireless communication, according to aspects of the disclosure. In an aspect, the process 600 may be performed by UE 302. In some designs, the UE performing the process 600 of FIG. 6 may correspond to a RedCap UE. However, other UE types (e.g., premium UEs that support eMBB and ULLRC) may perform the process 600 of FIG. 6 in other designs (e.g., to confirm full DSS support, etc.).

At 610, UE 302 (e.g., transmitter 314 or 324, etc.) transmits, to a network entity (e.g., a BS or gNB such as BS 304, an O-RAN component such as RU, DU or CU, etc.), a DSS capability indication, wherein the DSS capability indication indicates that the UE supports communications over a DSS carrier on which first RAT (e.g., NR) signaling and second RAT (e.g., LTE) signaling are scheduled (e.g., by co-located network entities). In some designs, the transmission at 610 may be implemented via RRC signaling (e.g., during an initial Attach procedure). In an example, the DSS carrier may correspond to FDD band n3 or n5, or TDD band n41. Support (or lack of support) for various DSS functions may be indicated by the DSS capability indication, as will be described below in more detail.

At 620, UE 302 (e.g., receiver 312 or 322, etc.) receives, from the network entity, scheduling information for resources on the DSS carrier based at least in part upon the DSS capability indication. For example, the scheduling information may be received via PDDCH (e.g., DCI). In an example, the scheduling information may be determined at the network entity (e.g., base station) so as to comply with the DSS capability of the UE as indicated via the DSS capability indication from 620. Various examples of DSS carrier resource configurations are described below with respect to FIGS. 8A-8C.

Figure 7:
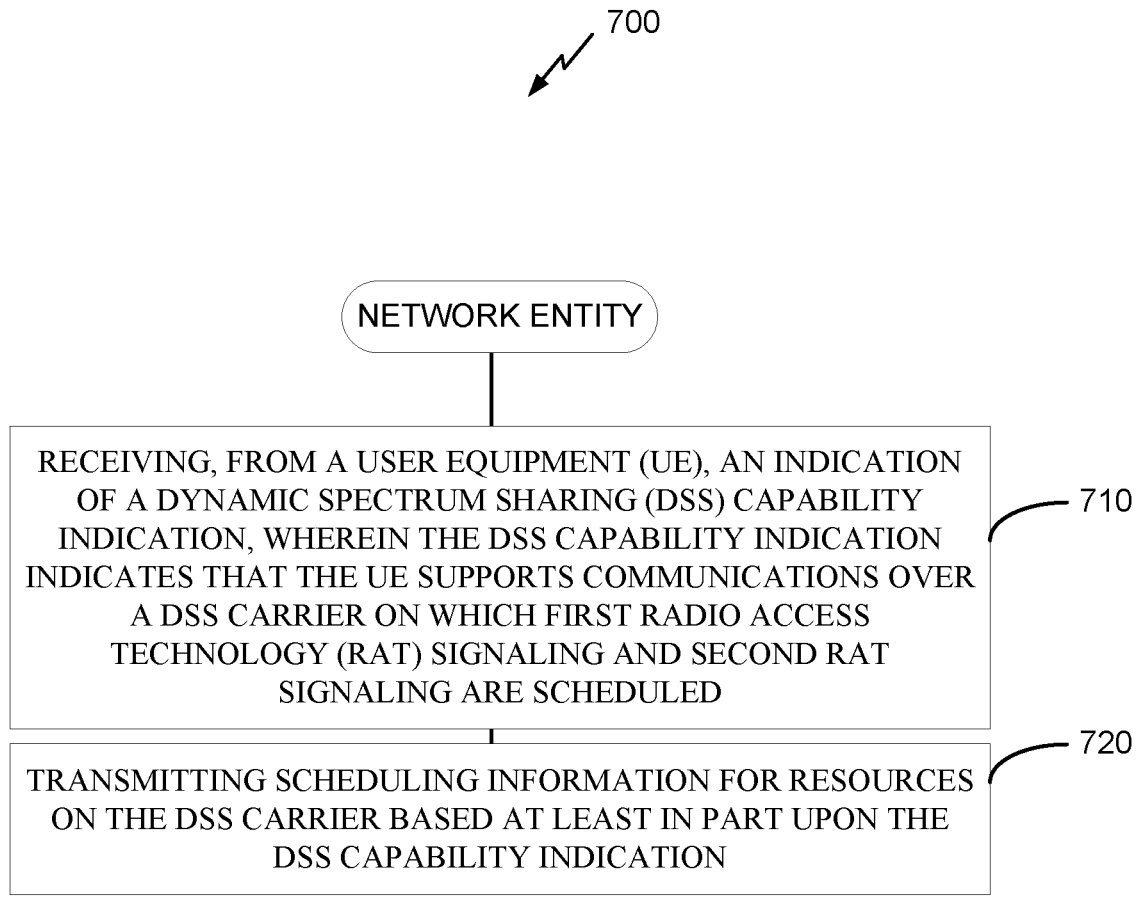
FIG. 7 illustrates an exemplary process of wireless communication, according to aspects of the disclosure.

FIG. 7 illustrates an exemplary process 700 of wireless communication, according to aspects of the disclosure. In an aspect, the process 700 of FIG. 7 may be performed by a network entity (e.g., a BS or gNB such as BS 304, an O-RAN component such as RU, DU or CU, etc.). In some designs, the network entity includes transceiver(s) (e.g., a network unit associated with multiple TRPs (multi-TRP)).

At 710, the network entity (e.g., receiver 352 or 362, etc.) receives, from a UE, a DSS capability indication, wherein the DSS capability indication indicates that the UE supports communications over a DSS carrier on which first RAT (e.g., NR) signaling and second RAT (e.g., LTE) signaling are scheduled. In an example, the DSS carrier may correspond to FDD band n3 or n5, or TDD band n41. In some designs, the reception at 710 may be implemented via RRC signaling (e.g., during an initial Attach procedure). Support (or lack of support) for various DSS functions may be indicated by the DSS capability indication, as will be described below in more detail. In some designs, the UE from which the DSS capability indicant is sent may correspond to a RedCap UE (e.g., which operates on the DSS carrier and is capable of processing downlink (DL) reference signals (RSs) from the first RAT and the second RAT). However, other UE types (e.g., premium UEs that support eMBB and ULLRC) may provide the DSS capability indication in other designs (e.g., to confirm full DSS support, etc.).

At 720, the network entity (e.g., transmitter 354 or 364, etc.) transmits scheduling information for resources on the DSS carrier based at least in part upon the DSS capability indication. For example, the scheduling information may be transmitted via PDDCH (e.g., DCI). In an example, the scheduling information may be determined at the network entity (e.g., base station) so as to comply with the DSS capability of the UE as indicated via the DSS capability indication from 620. Various examples of DSS carrier resource configurations are described below with respect to FIGS. 8A-8C.

Referring to FIGS. 6-7, in some designs, the DSS capability indication may indicate:
- whether processing of second RAT (e.g., LTE) Multimedia Broadcast multicast service Single Frequency Network (MBSFN) subframes is supported by the UE, or
- at least one supported port configuration associated with a second RAT DL RS (e.g., LTE CRS) for a non-MBSFN subframe, or
- at least one supported rate matching pattern for the second RAT DL RS (e.g., LTE CRS), or
- at least one alternative DMRS location on the DSS carrier,
- at least one TRS configuration for time, frequency, phase, ranging, positioning or a combination thereof on the DSS carrier,
- at least one CSI-RS on the DSS carrier, or
- a combination thereof.

Figure 8A:
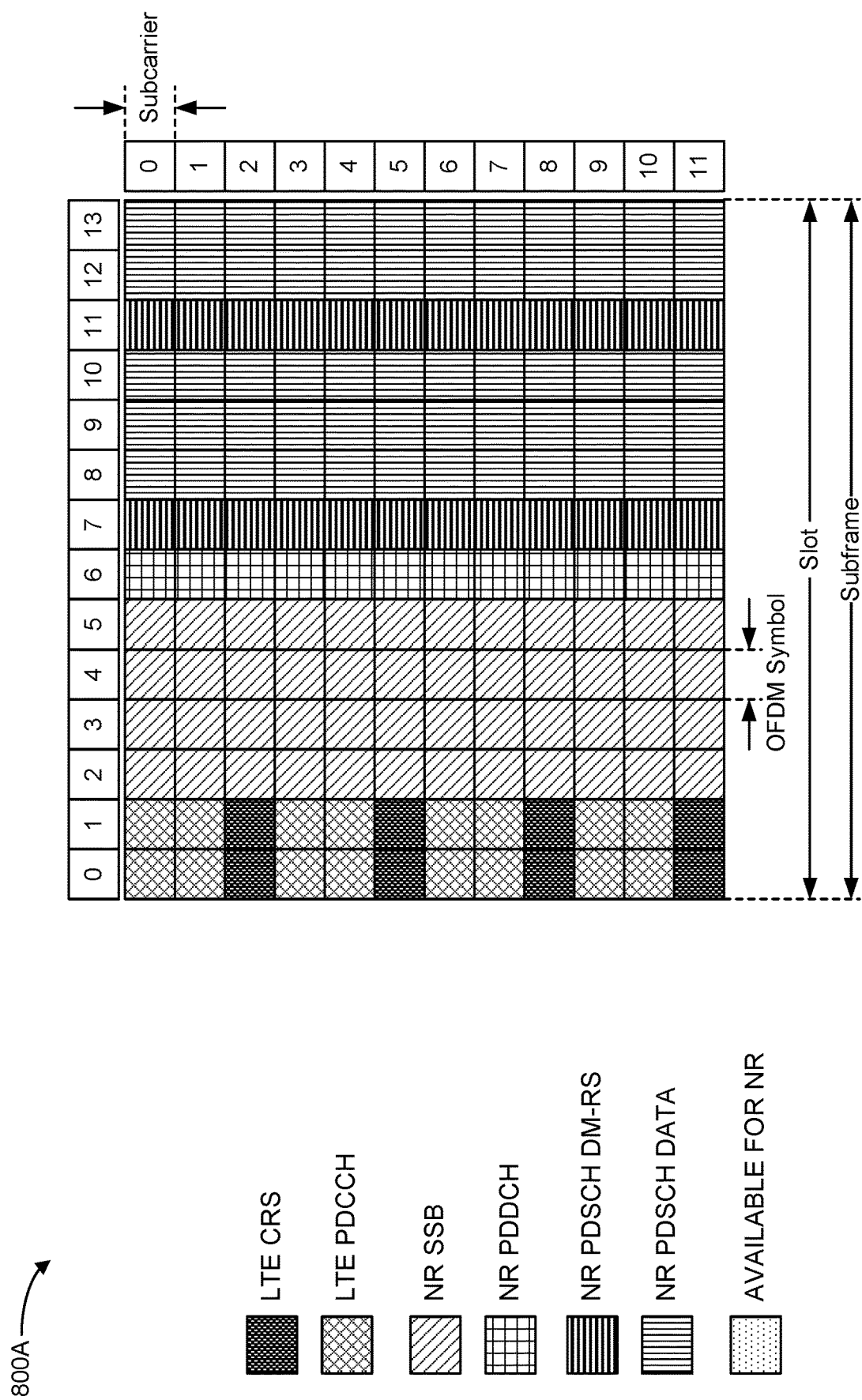
FIGS. 8A-8C illustrate examples of DSS carrier configuration that may be used in accordance with some aspects of the disclosure.
Figure 8B:
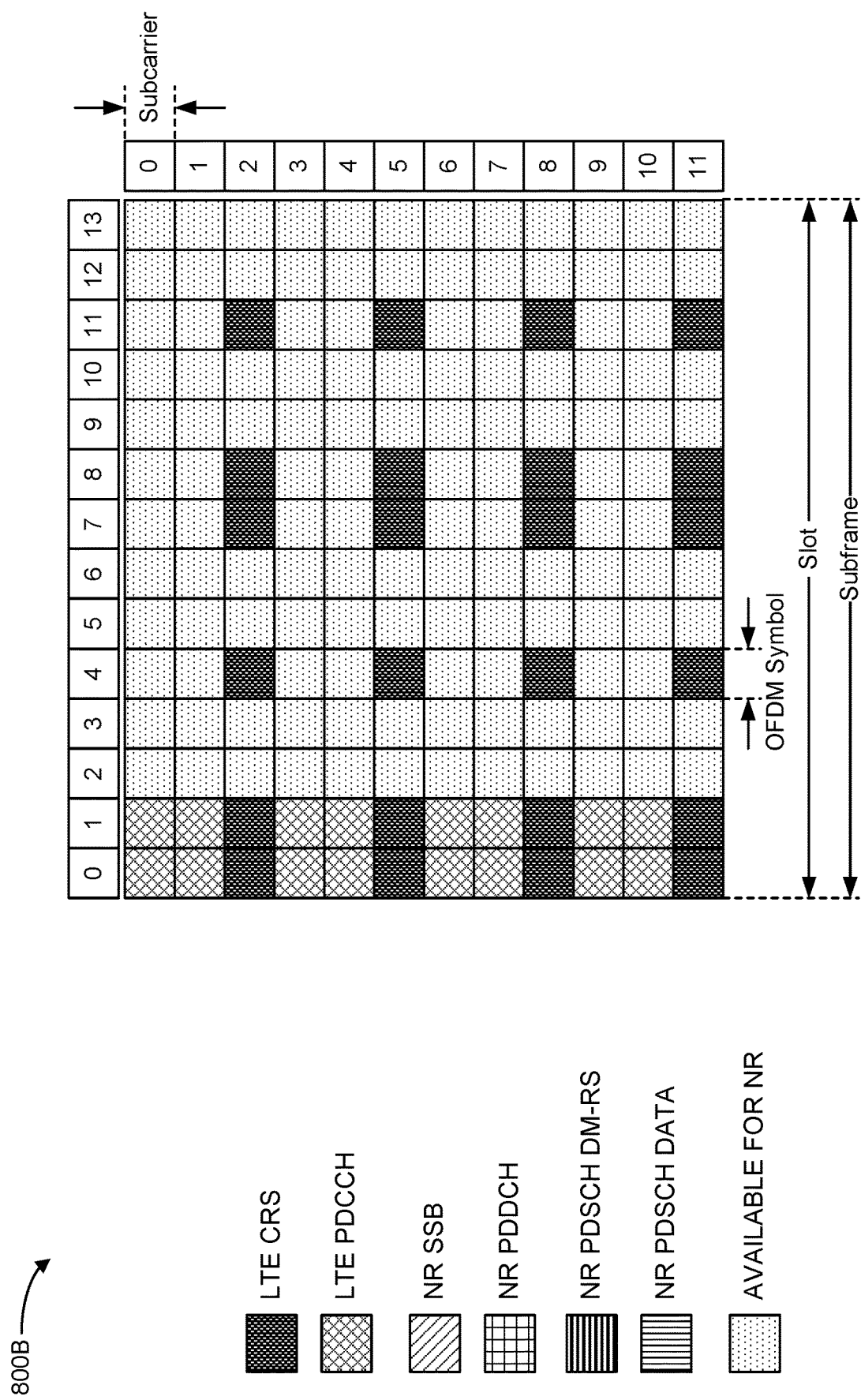
Figure 8C:
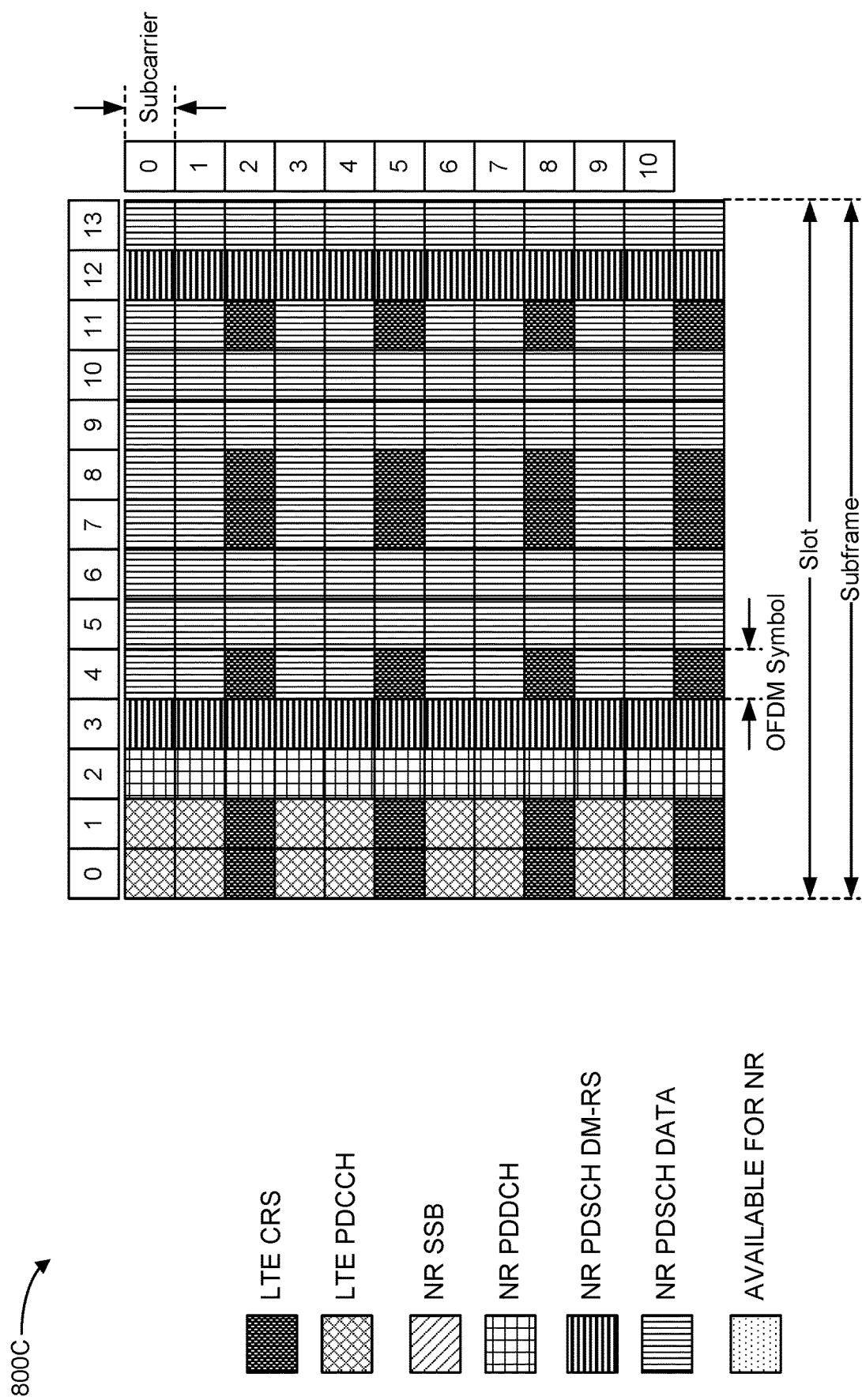

As noted above, the DSS capability indication can be used at the network entity (e.g., BS 304, etc.) to determine the scheduling information of resources on the DSS carrier. FIGS. 8A-8C illustrate examples of DSS carrier configuration that may be used in accordance with some aspects of the disclosure. In the examples depicted in FIGS. 8A-8C, the first RAT is NR and the second RAT is LTE. In FIG. 8A, a DSS carrier configuration 800A is depicted, whereby a NR 15 kHz SSB is scheduled in a MBSFN DSS subframe/slot. In FIG. 8B, a DSS carrier configuration 800B is depicted, whereby a NR 30 kHz SSB is scheduled in a non-MBSFN DSS subframe/slot. In FIG. 8C, a DSS carrier configuration 800C is depicted, which shows an NR DMRS pattern with LTE/NR coexistence.

Referring to FIGS. 6-7, in some designs, the scheduling information may allocate to the UE, in a second RAT (e.g., LTE) MBSFN subframe, one or more symbols for one or more physical channels carrying control information of the first RAT that is punctured or rate-matched based on a second RAT downlink (DL) reference signal (RS), one or more DL control channels of the second RAT, or both (e.g., one or more symbols for NR signaling that are separate from any symbol associated with LTE CRS signaling or LTE PDCCH signaling). In other words, the first RAT (e.g., NR) control information may be configured (e.g., by puncturing, rate-matching, etc.) so to protect or accommodate second RAT (e.g., LTE) RSs.

Referring to FIGS. 6-7, in some designs, the scheduling information may allocate to the UE, in a second RAT (e.g., LTE) non-MBSFN subframe, one or more symbols for one or more physical channels carrying control information of the first RAT that is punctured or rate-matched based on a second RAT downlink (DL) reference signal (RS), one or more DL control channels of the second RAT, or both (e.g., one or more symbols for NR signaling that are separate from any symbol associated with LTE CRS signaling or LTE physical downlink control channel PDCCH signaling or LTE Physical channel HybridARQ Indicator Channel (PHICH) signaling or LTE Physical Control Format Indicator Channel (PCFICH) signaling). For an example, RBs scheduled in this manner may be used to facilitate the UE to perform RB-level rate matching. In other words, the first RAT (e.g., NR) control information may be configured (e.g., by puncturing, rate-matching, etc.) so to protect or accommodate second RAT (e.g., LTE) RSs.

Referring to FIGS. 6-7, in some designs, the scheduling information may allocate to the UE, in a second RAT (e.g., LTE) non-MBSFN subframe, one or more resource elements (REs) for one or more physical channels carrying control information of the first RAT that is punctured or rate-matched based on a second RAT downlink (DL) reference signal (RS), one or more DL control channels of the second RAT, or both (e.g., one or more REs for NR signaling that are separate from any symbol associated with LTE CRS signaling or LTE PDCCH signaling or LTE PHICH signaling or LTE PCFICH signaling). For an example, REs scheduled in this manner may be used to facilitate the UE to perform RE-level rate matching. In other words, the first RAT (e.g., NR) control information may be configured (e.g., by puncturing, rate-matching, etc.) so to protect or accommodate second RAT (e.g., LTE) RSs.

Figure 9:
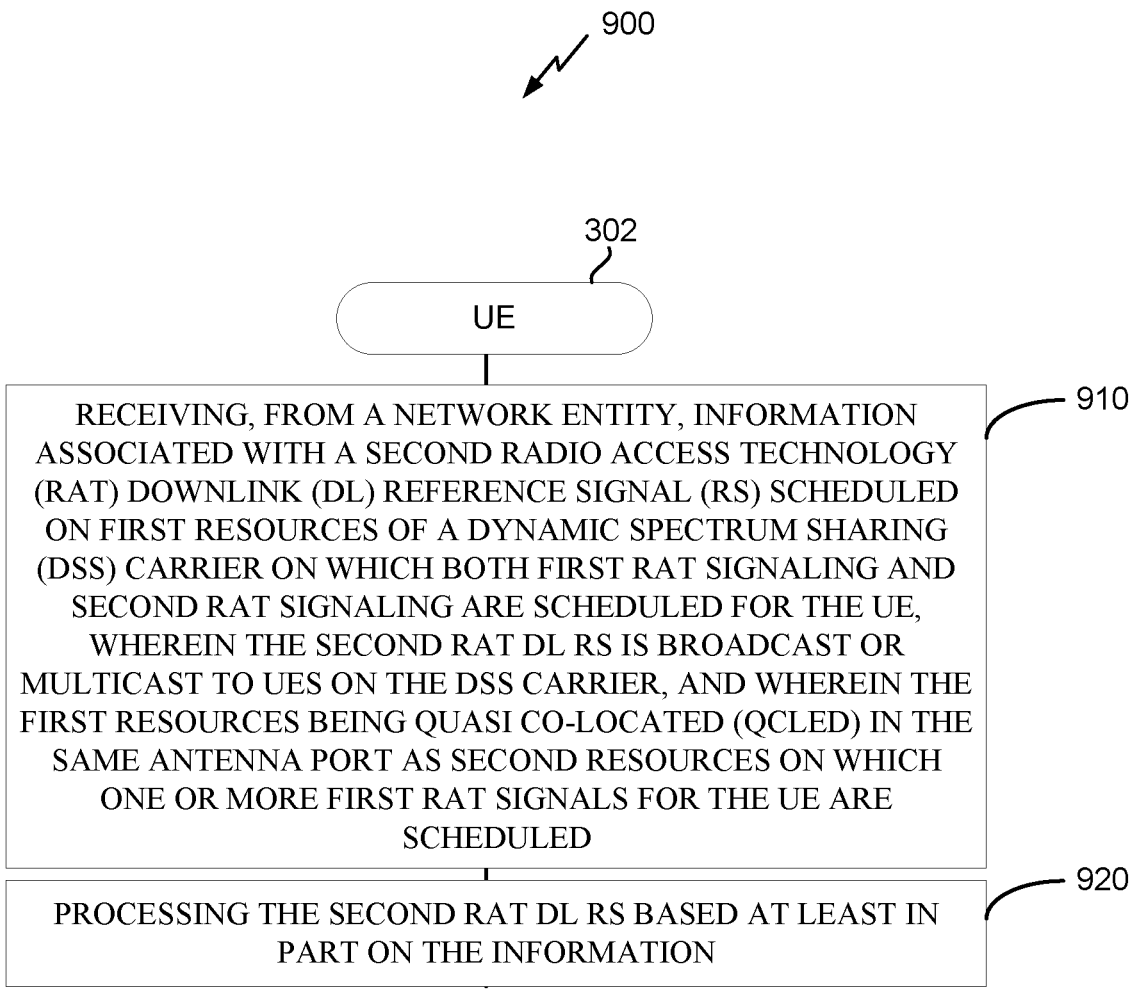
FIG. 9 illustrates an exemplary process of wireless communication, according to aspects of the disclosure.

FIG. 9 illustrates an exemplary process 900 of wireless communication, according to aspects of the disclosure. In an aspect, the process 900 may be performed by UE 302. In some designs, the UE performing the process 900 of FIG. 9 may correspond to a RedCap UE (e.g., which operates on the DSS carrier and is capable of processing downlink (DL) reference signals (RSs) from the first RAT and the second RAT). However, other UE types (e.g., premium UEs that support eMBB and ULLRC) may perform the process 900 of FIG. 9 in other designs.

At 910, UE 302 (e.g., receiver 312 or 322, etc.) receives, from a network entity (e.g., a BS or gNB such as BS 304, an O-RAN component such as RU, DU or CU, etc.), information associated with a second RAT DL RS (e.g., LTE CRS) scheduled on first resources of a DSS on which both first RAT (e.g., NR) signaling and second RAT (e.g., LTE) signaling are scheduled for the UE, wherein the second RAT DL RS is broadcast or multicast to UEs on the DSS carrier, and wherein the first resources being quasi co-located (QCLed) in the same antenna port as second resources on which one or more first RAT (e.g., NR) signals for the UE are scheduled. In an example, the DSS carrier may correspond to FDD band n3 or n5, or TDD band n41. In some designs, the information may be received via PDCCH (e.g., DCI). As will be described below in more detail, less than all of resources across the DSS carrier for the second RAT DL RS (e.g., LTE CRS) may be QCLed with the first RAT (e.g., NR) resources in this manner.

At 920, UE 302 (e.g., processing system 332, DDS module 342, etc.), the second RAT DL RS (e.g., LTE CRS) based at least in part on the LTE CRS information. There are a number of ways the second RAT DL RS (e.g., LTE CRS) may be processed to achieve various objectives, as will be described below in more detail. Generally, the QCL relationship between the second RAT DL RS (e.g., LTE CRS) and first RAT (e.g., NR) resources can be leveraged to achieve various synergistic objectives as part of the processing at 920.

Figure 10:
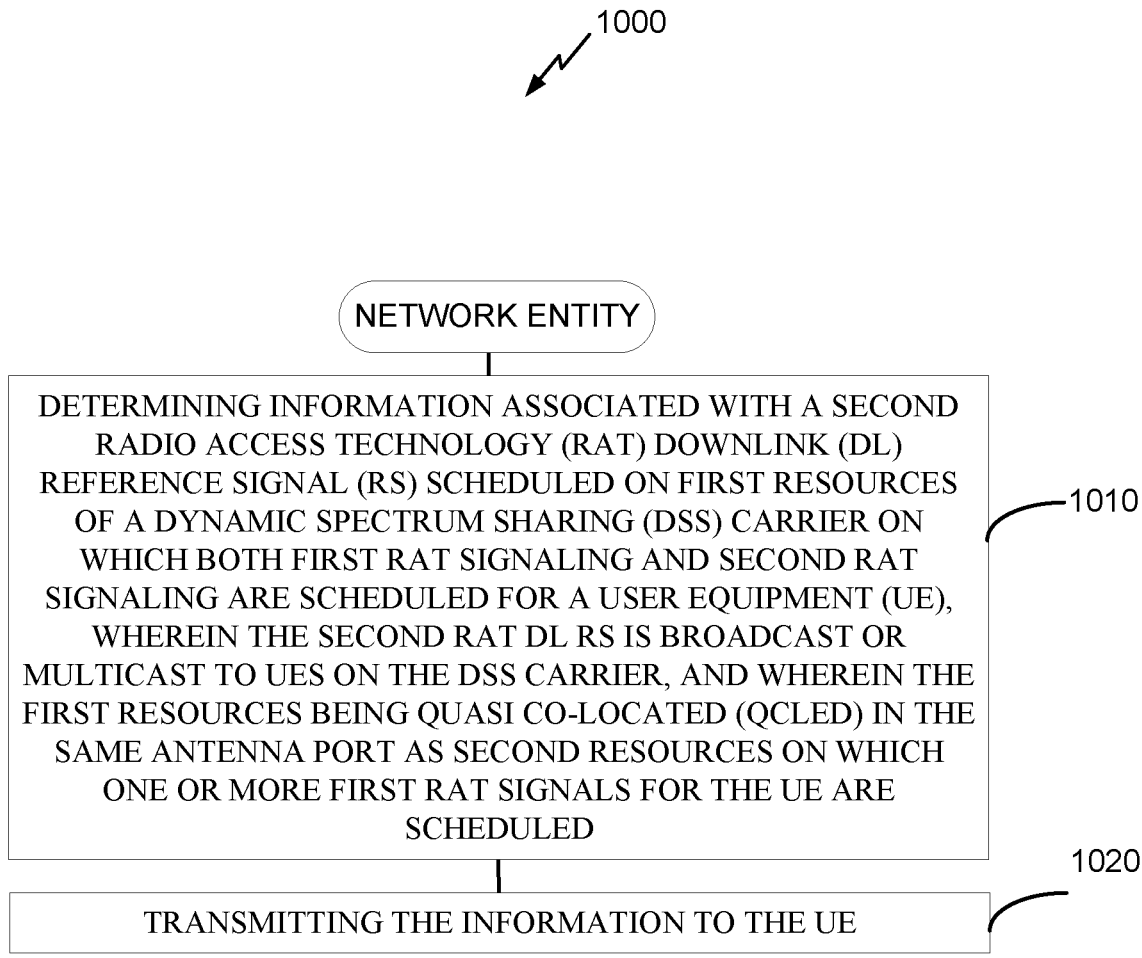
FIG. 10 illustrates an exemplary process of wireless communication, according to aspects of the disclosure.

FIG. 10 illustrates an exemplary process 1000 of wireless communication, according to aspects of the disclosure. In an aspect, the process 1000 of FIG. 10 may be performed by a network entity (e.g., a BS or gNB such as BS 304, an O-RAN component such as RU, DU or CU, etc.).

At 1010, the network entity (e.g., processing system 384, DDS module 388, etc.) determines information associated with a second RAT DL RS (e.g., LTE CRS) scheduled on first resources of a DSS on which both first RAT (e.g., NR) signaling and second RAT (e.g., LTE) signaling are scheduled for a UE, wherein the second RAT DL RS is broadcast or multicast to UEs on the DSS carrier, and wherein the first resources being quasi co-located (QCLed) in the same antenna port as second resources on which one or more first RAT (e.g., NR) signals for the UE are scheduled. In an example, the DSS carrier may correspond to FDD band n3 or n5, or TDD band n41. As will be described below in more detail, less than all of resources of the second RAT DL RS (e.g., LTE CRS) across the DSS carrier may be QCLed with the first RAT (e.g., NR) resources in this manner.

At 1020, the network entity (e.g., transmitter 354 or 364) transmits the information to the UE. In some designs, the information may be transmitted via PDCCH (e.g., DCI).

Referring to FIGS. 9-10, in some designs, depending on the QCL relationship between the second RAT DL RS (e.g., LTE CRS) and first RAT (e.g., NR) signals (e.g., NR SSB/CSI-RS/TRS/PTRS/PRS) on DSS carrier, the network entity (e.g., base station) can indicate the a second RAT (e.g., LTE) CRS pattern to the UE (e.g., RedCap or non-RedCap UE), to facilitate additional intra-frequency and inter-frequency measurements by the UE in any (e.g., NR) RRC state (e.g., NR RRC-Idle, NR RRC-Inactive, or NR RRC-Connected) or a subset of (e.g., NR) RRC states. For example, the (e.g., LTE CRS) information may include a second RAT (e.g., LTE) CRS pattern, a transmission power offset, a QCL relationship between the second RAT DL RS (e.g., LTE CRS) and first RAT (e.g., NR) system information (SI) signaling or dedicated RRC signaling, or a combination thereof. In a further example, the first resources that are QCLed in the same antenna port as the second resources may correspond to less than all second RAT DL RS (e.g., LTE CRS) resources of the DSS carrier (e.g., different groups of sub-carriers of the DSS carrier may be associated with different antenna ports). In a specific example, for LTE dynamic TDD, eNB transmits LTE CRS in every subframe, and gNB can configure UE to measure a subset of subframes associated with the DSS carrier.

Referring to FIGS. 9-10, in some designs, the processing at 920 may include performing measurements of the LTE CRS on the first resources without a measurement gap between successive instances of the second RAT DL RS (e.g., in case of intra-frequency measurement of second RAT DL RS, e.g., LTE CRS, successive instances of the LTE CRS may be measured continuously without a gap). For example, the measurement gaps between SSB as shown in FIG. 5A can be omitted with respect to LTE CRS as shown in FIG. 5B. For example, LTE CRS is transmitted continuously such that measurement gaps (e.g., 20 ms light sleep mode gaps) between successive CRS measurements are not needed.

Referring to FIGS. 9-10, in some designs, the processing at 920 may include rate-matching on the first resources based on the second RAT DL RS (e.g., LTE CRS) irrespective of whether the UE is configured with a second RAT DL RS (e.g., LTE CRS) rate-matching pattern.

Referring to FIGS. 9-10, in some designs, the processing at 920 may include adding the second RAT DL RS (e.g., LTE CRS) as an additional reference signal (RS) source ID for one or more of:

time and/or frequency tracking, or
pathloss estimation, or
UE-assisted positioning or UE-based positioning, or
reference signal received power (RSRP) measurement, or
spatial relation configuration for random access procedures of the first RAT and the second RAT, or
radio link monitoring (RLM) measurements, or
beam monitoring (BM) measurements, or
radio resource management (RRM) measurements, or
a combination thereof.

Referring to FIGS. 9-10, in some designs, the processing at 920 may include combining one or more first measurements for the first RAT and one or more second measurements for the second RAT (e.g., one or more measurements of the LTE CRS with one or more other measurements associated with the one or more NR signals). In a specific example, the measurements may be combined to improve the performance of the UE operating on the radio resources shared by the first RAT and the second RAT, and the combined measurements can be applied to UE procedures including at least coverage enhancement, joint channel estimation and interference cancellation and measurements in power saving mode (e.g., C-DRX, enhanced DRX idle/inactive mode including small data transmission (SDT), maintenance of tracking loops to receive system information, paging early indication (PEI), short message of paging, and paging message, and so on). In an NR-specific example, the one or more first measurements are associated with one or more signal synchronization blocks SSBs, one or more CSI-RSs, one or more TRSs for time, frequency, phase, ranging, positioning, or a combination thereof. In another example, the combining may include defining a transmission power offset between the second RAT DL RS (e.g., LTE CRS) and the one or more first RAT (e.g., NR) signals (e.g., which can then be signaled by gNB to UE). In another example, the combining may include defining one or more L1 and/or L3 filtering coefficients (e.g., which can then be signaled by gNB to UE, or else may leave up to UE implementation).

Referring to FIGS. 9-10, in some designs, the UE may be in first RAT (e.g., NR) RRC-Idle mode or first RAT (e.g., NR) RRC-Inactive mode during the processing of 920 (and/or when the information is communicated at 910 or 1020), and the processing of 920 may include using the second RAT DL RS (e.g., LTE CRS) as a TRS for the UE (e.g., a supplemental TRS that supplements the first RAT or NR TRS) (e.g., to adjust offsets with respect to the network entity of the first RAT in time, frequency, phase, ranging or positioning or a combination thereof). In this case, in an example, the information may include indication of an availability and rate matching pattern of the second RAT DL RS, e.g., LTE CRS (e.g., via SI or RRC messaging). In some designs, the second RAT DL RS (e.g., LTE CRS) pattern configured by the network entity (e.g., gNB, etc.) for the UE may be a subset of second RAT DL RS (e.g., LTE CRS) actually transmitted by the network entity, e.g., eNB (e.g., the QCLed subset of LTE CRS as noted above). In some designs, the UE (e.g., RedCap UE or non-RedCap UE) may rate-match first RAT signaling based on the LTE CRS rate-matching pattern indicated by gNB.

Figure 11:
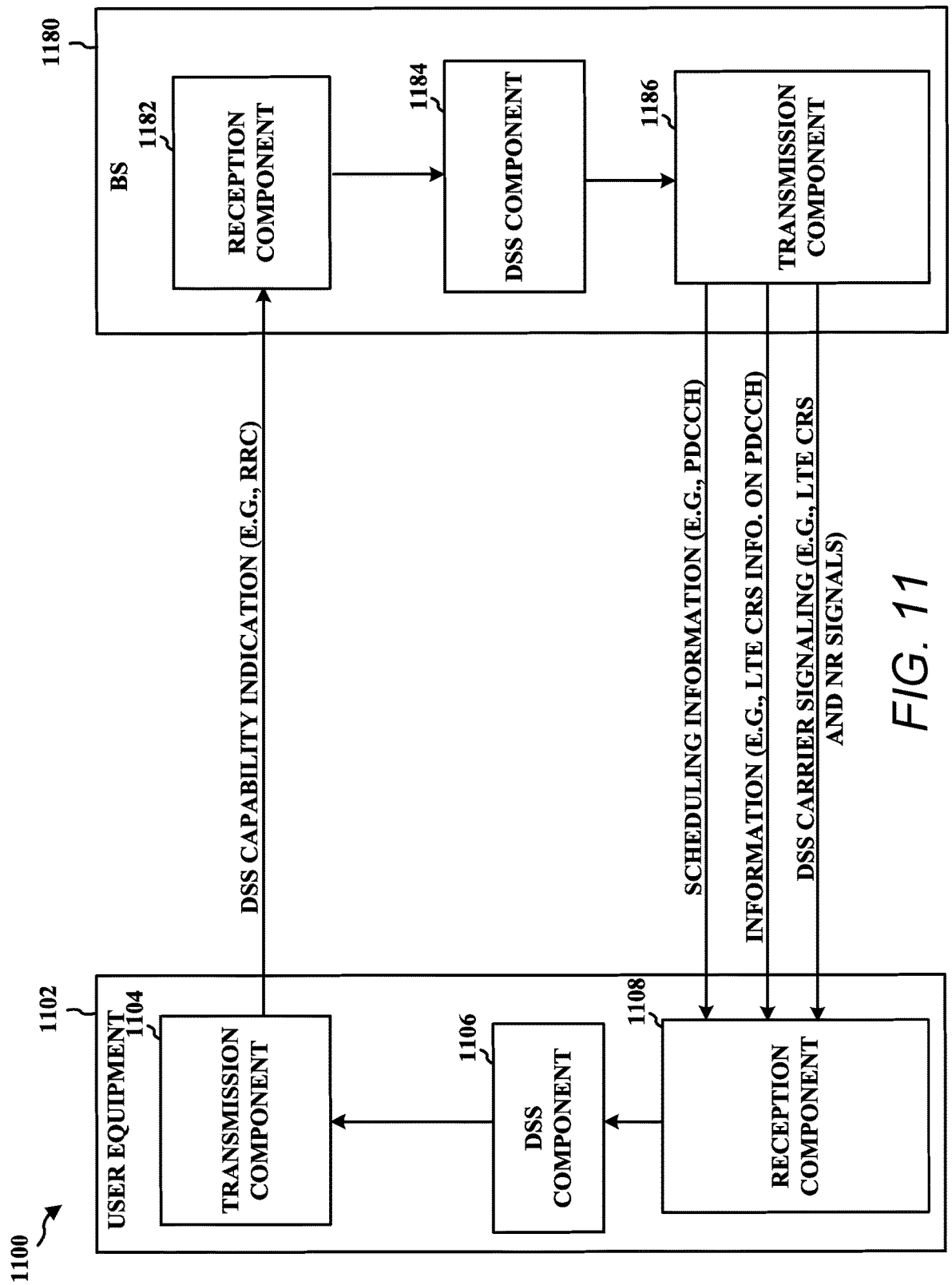
FIG. 11 is a conceptual data flow diagram illustrating the data flow between different means/components in exemplary apparatuses in accordance with an aspect of the disclosure.

FIG. 11 is a conceptual data flow diagram 1100 illustrating the data flow between different means/components in exemplary apparatuses 1102 and 1180 in accordance with an aspect of the disclosure. The apparatus 1102 may be a UE (e.g., UE 302) in communication with an apparatus 1180, which may be a network entity (e.g., a BS or gNB such as BS 304, an O-RAN component such as RU, DU or CU, etc.).

The apparatus 1102 includes a transmission component 1104, which may correspond to transmitter circuitry in UE 302 as depicted in FIG. 3A, including transmitter(s) 314 and 324, antenna(s) 316 and 326, etc. The apparatus 1102 further includes DSS component 1106, which may correspond to processor circuitry in UE 302 as depicted in FIG. 3A, including processing system 332, etc. The apparatus 1102 further includes a reception component 1108, which may correspond to receiver circuitry in UE 302 as depicted in FIG. 3A, including receiver(s) 312 and 322, antenna(s) 316 and 326, etc.

The apparatus 1180 includes a transmission component 1186, which may correspond to transmitter circuitry in BS 304 as depicted in FIG. 3B, including transmitter(s) 354 and 364, antenna(s) 356 and 366, etc. (e.g., or to similar structure implemented at a respective O-RAN component such as RU, DU, CU, etc.). The apparatus 1180 further includes DSS component 1184, which may correspond to processor circuitry in BS 304 as depicted in FIG. 3B, including processing system 384, etc. (e.g., or to similar structure implemented at a respective O-RAN component such as RU, DU, CU, etc.). The apparatus 1180 further includes a reception component 1182, which may correspond to receiver circuitry in BS 304 as depicted in FIG. 3B, including receiver(s) 352 and 362, antenna(s) 356 and 366, etc. (e.g., or to similar structure implemented at a respective O-RAN component such as RU, DU, CU, etc.).

Referring to FIG. 11, the transmission component 1104 transmits a DSS capability indication to the reception component 1182, which forwards the DSS capability indication to the DSS component 1184. The DSS component 1184 determines scheduling information of DSS carrier signaling (e.g., first RAT or NR signals) based on the DSS capability indication, which is transmitted by the transmission component 1186 to the reception component 1108, which forwards the scheduling information to the DSS component 1106. The DSS component 1184 further determines second RAT DL RS (e.g., LTE CRS) information that is transmitted by the transmission component 1186 to the reception component 1108, which forwards the second RAT DL RS (e.g., LTE CRS) information to the DSS component 1106. The DSS component 1106 may then process the second RAT DL RS (e.g., LTE CRS) based in part on the second RAT DL RS (e.g., LTE CRS) information.

One or more components of the apparatus 1102 and apparatus 1180 may perform each of the blocks of the algorithm in the aforementioned flowcharts of FIGS. 6-7 and/or 9-10. As such, each block in the aforementioned flowcharts of FIGS. 6-7 and/or 9-10 may be performed by a component and the apparatus 1102 and apparatus 1180 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
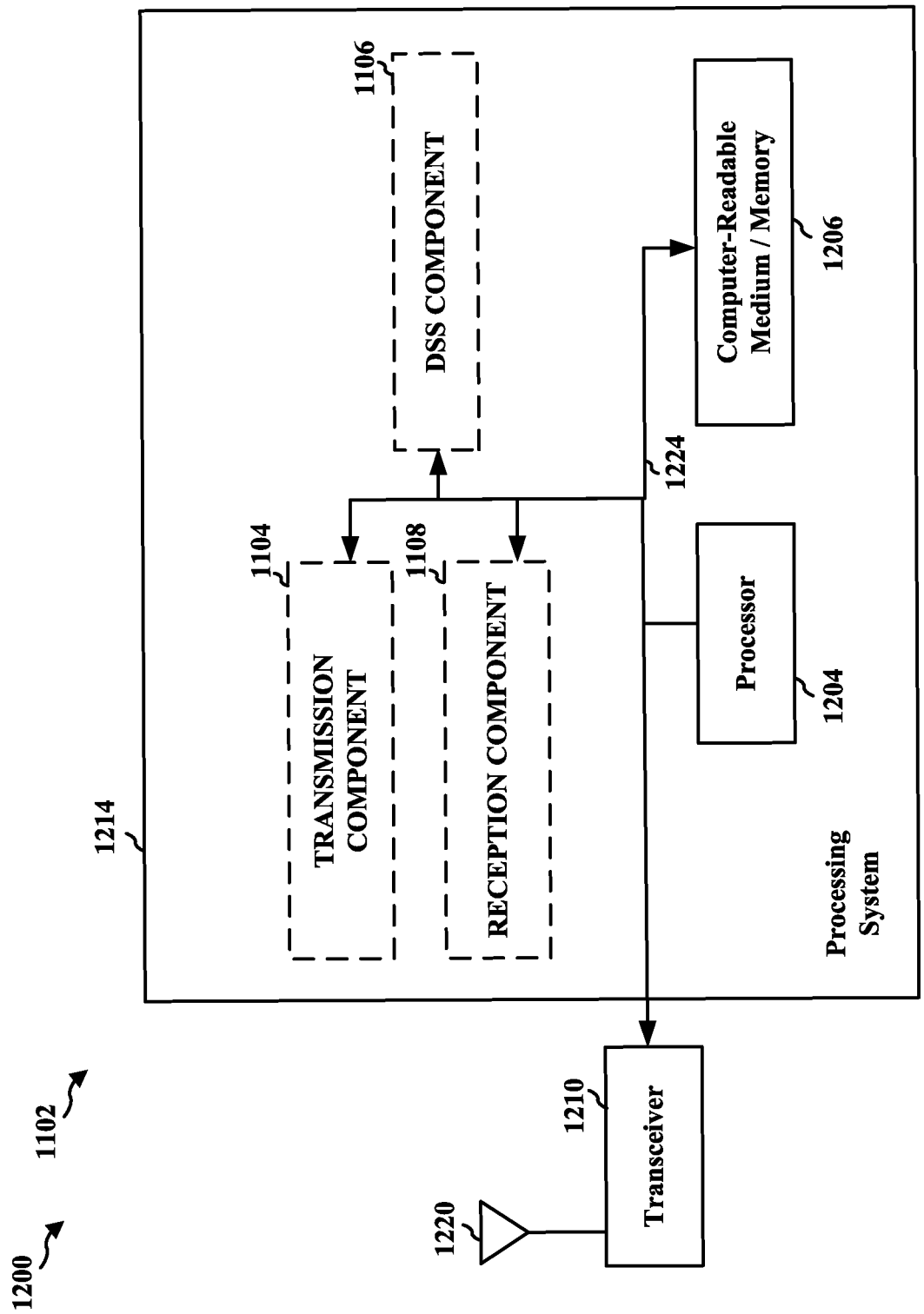
FIGS. 12-13 are diagrams illustrating examples of hardware implementations for apparatuses employing processing systems.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1104, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106 and 1108. The components may be software components running in the processor 1204, resident/stored in the computer readable medium/memory 1206, one or more hardware components coupled to the processor 1204, or some combination thereof.

In one configuration, the apparatus 1102 (e.g., a UE) for wireless communication includes means for transmitting, to a network entity, a dynamic spectrum sharing (DSS) capability indication, wherein the DSS capability indication indicates that the UE supports communications over a DSS carrier on which first radio access technology (RAT) signaling and second RAT signaling are scheduled, and means for receiving, from the network entity, scheduling information for resources on the DSS carrier based at least in part upon the DSS capability indication.

In another configuration, the apparatus 1102 (e.g., a UE) for wireless communication includes means for receiving, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, the first resources being quasi co-located (QCLed) in the same antenna port as second resources on which one or more first RAT signals for the UE are scheduled, and means for processing the second RAT DL RS based at least in part on the information.

The aforementioned means may be one or more of the aforementioned components of the apparatus 1102 and/or the processing system 1214 of the apparatus 1102 configured to perform the functions recited by the aforementioned means.

Figure 13:
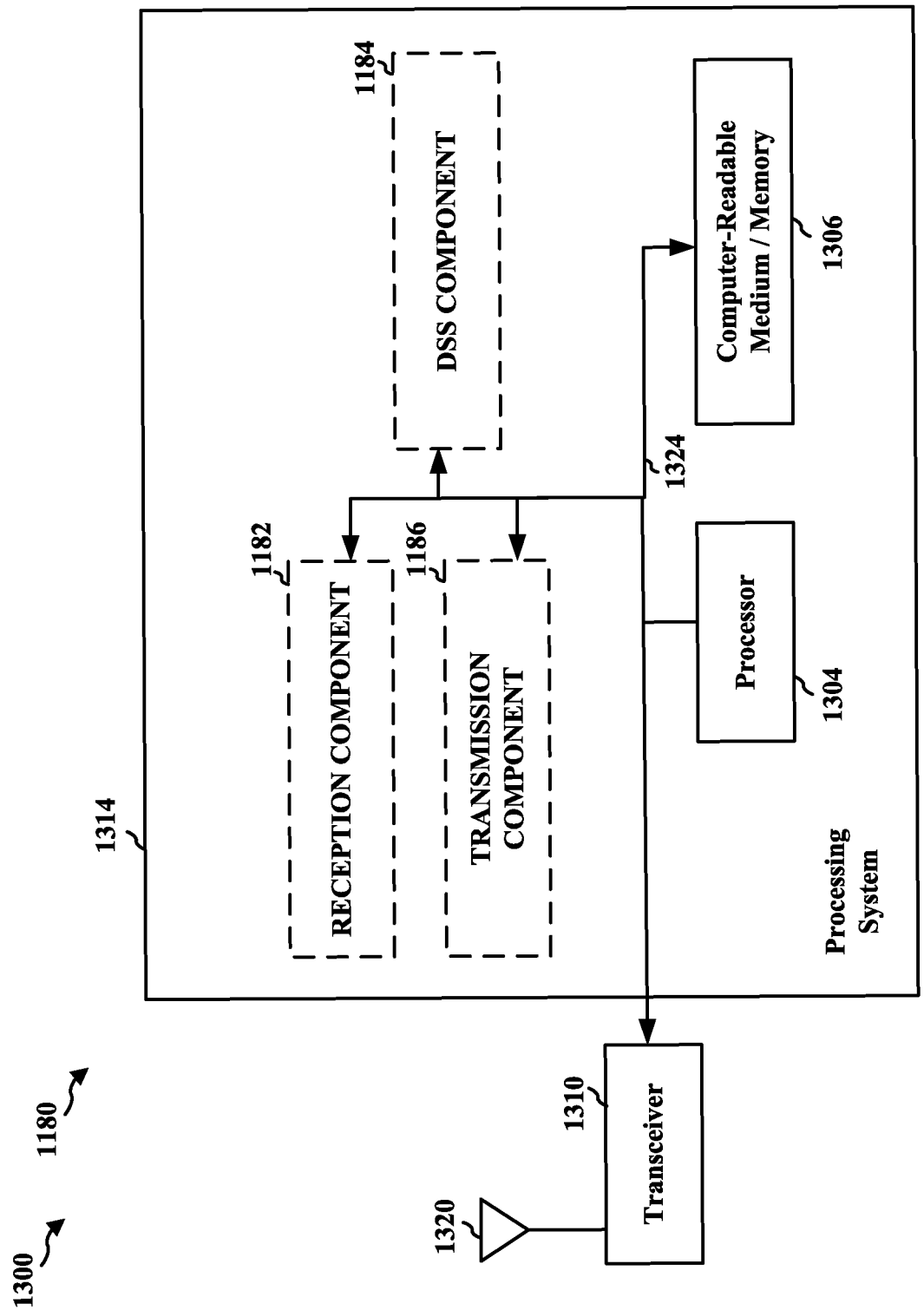

FIG. 13 is a diagram 1300 illustrating an example of a hardware implementation for an apparatus 1180 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1182, 1184 and 1186, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1182. In addition, the transceiver 1310 receives information from the processing system 1314, specifically the transmission component 1186, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1182, 1184 and 1186. The components may be software components running in the processor 1304, resident/stored in the computer readable medium/memory 1306, one or more hardware components coupled to the processor 1304, or some combination thereof.

In one configuration, the apparatus 1180 (e.g., a network entity such as a BS or O-RAN component, etc.) for wireless communication may include means for receiving, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled, and means for transmitting scheduling information for resources on the DSS carrier based at least in part upon the DSS capability indication.

In another configuration, the apparatus 1180 (e.g., a network entity such as a BS or O-RAN component, etc.) for wireless communication may include means for determining information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled, and means for transmitting the information to the UE.

The aforementioned means may be one or more of the aforementioned components of the apparatus 1180 and/or the processing system 1314 of the apparatus 1180 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: transmitting, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receiving, from the network entity, scheduling information for resources on the DSS carrier based at least in part upon the DSS capability indication.

Clause 2. The method of clause 1, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 3. The method of any of clauses 1 to 2, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 4. The method of any of clauses 1 to 3, wherein the scheduling information allocates to the UE, in a second RAT non-Multimedia Broadcast multicast service Single Frequency Network (non-MBSFN) subframe, one or more symbols for one or more physical channels carrying control information of the first RAT that punctured or rate-matched based on: a second RAT downlink (DL) reference signal (RS), one or more DL control channels of the second RAT, or both.

Clause 5. The method of any of clauses 1 to 4, wherein the scheduling information allocates to the UE, in a second RAT non-Multimedia Broadcast multicast service Single Frequency Network (non-MBSFN) subframe, one or more resource elements (REs) for one or more physical channels control information of the first RAT that is punctured or rate-matched based on: a second RAT downlink (DL) reference signal (RS), one or more DL control channels of the second RAT, or both.

Clause 6. The method of any of clauses 1 to 5, wherein the UE corresponds to a reduced capability (RedCap) UE, which operates on the DSS carrier and is capable of processing downlink (DL) reference signals (RSs) from the first RAT and the second RAT.

Clause 7. A method of operating a network entity, comprising: receiving, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmitting scheduling information for resources on the DSS carrier based at least in part upon the DSS capability indication.

Clause 8. The method of clause 7, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 9. The method of any of clauses 7 to 8, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 10. The method of any of clauses 7 to 9, wherein the scheduling information allocates to the UE, in a second RAT non-Multimedia Broadcast multicast service Single Frequency Network (non-MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 11. The method of any of clauses 7 to 10, wherein the scheduling information allocates to the UE, in a second RAT non-Multimedia Broadcast multicast service Single Frequency Network (non-MBSFN) subframe, one or more resource elements (REs) for one or more physical channels carrying control information of the first RAT that is punctured or rate-matched based on: a second RAT downlink (DL) reference signal (RS), one or more DL control channels of the second RAT, or both.

Clause 12. The method of any of clauses 7 to 11, wherein the UE corresponds to a reduced capability (RedCap) UE.

Clause 13. A method of operating a user equipment (UE), comprising: receiving, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and processing the second RAT DL RS based at least in part on the information.

Clause 14. The method of clause 13, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 15. The method of any of clauses 13 to 14, wherein the first resources that are QCLed in the same antenna port as the second resources correspond to less than all resources associated with the second RAT DL RS of the DSS carrier.

Clause 16. The method of any of clauses 13 to 15, wherein the processing comprises performing measurements of the second RAT DL RS on the first resources without a measurement gap between successive instances of the second RAT DL RS.

Clause 17. The method of any of clauses 13 to 16, wherein the processing comprises rate-matching on the first resources based on the second RAT DL RS irrespective of whether the UE is configured with a rate-matching pattern associated with the second RAT DL RS.

Clause 18. The method of any of clauses 13 to 17, wherein the processing comprises adding the second RAT DL RS as an additional RS source ID for one or more of: time and/or frequency tracking, or pathloss estimation, or UE-assisted positioning or UE-based positioning, or reference signal received power (RSRP) measurement, or spatial relation configuration for random access procedures of the first RAT and the second RAT, or radio link monitoring (RLM)

measurements, or beam monitoring (BM) measurements, or radio resource management (RRM) measurements, or a combination thereof.

Clause 19. The method of any of clauses 13 to 18, wherein the processing comprises combining one or more first measurements for the first RAT and one or more second measurements for the second RAT.

Clause 20. The method of clause 19, wherein the one or more first measurements are associated with: one or more signal synchronization blocks (SSBs), one or more channel state information reference signals (CSI-RSs), one or more tracking reference signals (TRSs) for time, frequency, phase, ranging, positioning or a combination thereof, or a combination thereof.

Clause 21. The method of any of clauses 19 to 20, wherein the combining comprises defining a transmission power offset between the second RAT DL RS and one or more first RAT signals associated with the one or more first measurements.

Clause 22. The method of any of clauses 19 to 21, wherein the combining comprises defining one or more L1 and/or L3 filtering coefficients.

Clause 23. The method of any of clauses 13 to 22, wherein the UE is in a radio resource control (RRC) idle or inactive state during the processing, and wherein the processing comprises using the second RAT DL RS as a tracking reference signal (TRS) for the UE to adjust offsets with respect to the network entity of the second RAT in timing, frequency, phase, ranging, positioning, or a combination thereof.

Clause 24. The method of clause 23, wherein the information comprises indication of an availability and rate matching pattern of the second RAT DL RS.

Clause 25. A method of operating a network entity, comprising: determining information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmitting the information to the UE.

Clause 26. The method of clause 25, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 27. The method of any of clauses 25 to 26, wherein the first resources that are QCLed in the same antenna port as the second resources correspond to less than all resources of the DSS carrier that are associated with the second RAT DL RS.

Clause 28. The method of any of clauses 25 to 27, wherein the UE is in a radio resource control (RRC) idle or inactive state when the information is transmitted to the UE.

Clause 29. A user equipment (UE), comprising: a memory; at least one transceiver; and at least one processor communicatively coupled to the memory and the at least one transceiver, the at least one processor configured to: transmit, via the at least one transceiver, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receive, via the at least one transceiver, from the network entity, scheduling information for resources on the DSS carrier based at least in part upon the DSS capability indication.

Clause 30. The UE of clause 29, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 31. The UE of any of clauses 29 to 30, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 32. The UE of any of clauses 29 to 31, wherein the scheduling information allocates to the UE, in a second RAT non-Multimedia Broadcast multicast service Single Frequency Network (non-MBSFN) subframe, one or more symbols for one or more physical channels carrying control information of the first RAT that punctured or rate-matched based on: a second RAT downlink (DL) reference signal (RS), one or more DL control channels of the second RAT, or both.

Clause 33. The UE of any of clauses 29 to 32, wherein the scheduling information allocates to the UE, in a second RAT non-Multimedia Broadcast multicast service Single Frequency Network (non-MBSFN) subframe, one or more resource elements (REs) for one or more physical channels control information of the first RAT that is punctured or rate-matched based on: a second RAT downlink (DL) reference signal (RS), one or more DL control channels of the second RAT, or both.

Clause 34. The UE of any of clauses 29 to 33, wherein the UE corresponds to a reduced capability (RedCap) UE, which operates on the DSS carrier and is capable of processing downlink (DL) reference signals (RSs) from the first RAT and the second RAT.

Clause 35. A network entity, comprising: a memory; at least one transceiver; and at least one processor communicatively coupled to the memory and the at least one transceiver, the at least one processor configured to: receive, via the at least one transceiver, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmit, via the at least one transceiver, scheduling information for resources on the DSS carrier based at least in part upon the DSS capability indication.

Clause 36. The network entity of clause 35, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 37. The network entity of any of clauses 35 to 36, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 38. The network entity of any of clauses 35 to 37, wherein the scheduling information allocates to the UE, in a second RAT non-Multimedia Broadcast multicast service Single Frequency Network (non-MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 39. The network entity of any of clauses 35 to 38, wherein the scheduling information allocates to the UE, in a second RAT non-Multimedia Broadcast multicast service Single Frequency Network (non-MBSFN) subframe, one or more resource elements (REs) for one or more physical channels carrying control information of the first RAT that is punctured or rate-matched based on: a second RAT downlink (DL) reference signal (RS), one or more DL control channels of the second RAT, or both.

Clause 40. The network entity of any of clauses 35 to 39, wherein the UE corresponds to a reduced capability (RedCap) UE.

Clause 41. An UE, comprising: a memory; at least one transceiver; and at least one processor communicatively coupled to the memory and the at least one transceiver, the at least one processor configured to: receive, via the at least one transceiver, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and process the second RAT DL RS based at least in part on the information.

Clause 42. The UE of clause 41, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 43. The UE of any of clauses 41 to 42, wherein the first resources that are QCLed in the same antenna port as the second resources correspond to less than all resources associated with the second RAT DL RS of the DSS carrier.

Clause 44. The UE of any of clauses 41 to 43, wherein the processing comprises performing measurements of the second RAT DL RS on the first resources without a measurement gap between successive instances of the second RAT DL RS.

Clause 45. The UE of any of clauses 41 to 44, wherein the processing comprises rate-matching on the first resources based on the second RAT DL RS irrespective of whether the UE is configured with a rate-matching pattern associated with the second RAT DL RS.

Clause 46. The UE of any of clauses 41 to 45, wherein the processing comprises adding the second RAT DL RS as an additional RS source ID for one or more of: time and/or frequency tracking, or pathloss estimation, or UE-assisted positioning or UE-based positioning, or reference signal received power (RSRP) measurement, or spatial relation configuration for random access procedures of the first RAT and the second RAT, or radio link monitoring (RLM) measurements, or beam monitoring (BM) measurements, or radio resource management (RRM) measurements, or a combination thereof.

Clause 47. The UE of any of clauses 41 to 46, wherein the processing comprises combining one or more first measurements for the first RAT and one or more second measurements for the second RAT.

Clause 48. The UE of clause 47, wherein the one or more first measurements are associated with: one or more signal synchronization blocks (SSBs), one or more channel state information reference signals (CSI-RSs), one or more tracking reference signals (TRSs) for time, frequency, phase, ranging, positioning or a combination thereof, or a combination thereof.

Clause 49. The UE of any of clauses 47 to 48, wherein the combining comprises defining a transmission power offset between the second RAT DL RS and one or more first RAT signals associated with the one or more first measurements.

Clause 50. The UE of any of clauses 47 to 49, wherein the combining comprises defining one or more L1 and/or L3 filtering coefficients.

Clause 51. The UE of any of clauses 41 to 50, wherein the UE is in a radio resource control (RRC) idle or inactive state during the processing, and wherein the processing comprises using the second RAT DL RS as a tracking reference signal (TRS) for the UE to adjust offsets with respect to the network entity of the second RAT in timing, frequency, phase, ranging, positioning, or a combination thereof.

Clause 52. The UE of clause 51, wherein the information comprises indication of an availability and rate matching pattern of the second RAT DL RS.

Clause 53. A network entity, comprising: a memory; at least one transceiver; and at least one processor communicatively coupled to the memory and the at least one transceiver, the at least one processor configured to: determine information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmit, via the at least one transceiver, the information to the UE.

Clause 54. The network entity of clause 53, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 55. The network entity of any of clauses 53 to 54, wherein the first resources that are QCLed in the same antenna port as the second resources correspond to less than all resources of the DSS carrier that are associated with the second RAT DL RS.

Clause 56. The network entity of any of clauses 53 to 55, wherein the UE is in a radio resource control (RRC) idle or inactive state when the information is transmitted to the UE.

Clause 57. A user equipment (UE), comprising: means for transmitting, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and means for receiving, from the network entity, scheduling information for resources on the DSS carrier based at least in part upon the DSS capability indication.

Clause 58. The UE of clause 57, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 59. The UE of any of clauses 57 to 58, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 60. The UE of any of clauses 57 to 59, wherein the scheduling information allocates to the UE, in a second RAT non-Multimedia Broadcast multicast service Single Frequency Network (non-MBSFN) subframe, one or more symbols for one or more physical channels carrying control information of the first RAT that punctured or rate-matched based on: a second RAT downlink (DL) reference signal (RS), one or more DL control channels of the second RAT, or both.

Clause 61. The UE of any of clauses 57 to 60, wherein the scheduling information allocates to the UE, in a second RAT non-Multimedia Broadcast multicast service Single Frequency Network (non-MBSFN) subframe, one or more resource elements (REs) for one or more physical channels control information of the first RAT that is punctured or rate-matched based on: a second RAT downlink (DL) reference signal (RS), one or more DL control channels of the second RAT, or both.

Clause 62. The UE of any of clauses 57 to 61, wherein the UE corresponds to a reduced capability (RedCap) UE, which operates on the DSS carrier and is capable of processing downlink (DL) reference signals (RSs) from the first RAT and the second RAT.

Clause 63. A network entity, comprising: means for receiving, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and means for transmitting scheduling information for resources on the DSS carrier based at least in part upon the DSS capability indication.

Clause 64. The network entity of clause 63, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 65. The network entity of any of clauses 63 to 64, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 66. The network entity of any of clauses 63 to 65, wherein the scheduling information allocates to the UE, in a second RAT non-Multimedia Broadcast multicast service Single Frequency Network (non-MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 67. The network entity of any of clauses 63 to 66, wherein the scheduling information allocates to the UE, in a second RAT non-Multimedia Broadcast multicast service Single Frequency Network (non-MBSFN) subframe, one or more resource elements (REs) for one or more physical channels carrying control information of the first RAT that is punctured or rate-matched based on: a second RAT downlink (DL) reference signal (RS), one or more DL control channels of the second RAT, or both.

Clause 68. The network entity of any of clauses 63 to 67, wherein the UE corresponds to a reduced capability (RedCap) UE.

Clause 69. An UE, comprising: means for receiving, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and means for processing the second RAT DL RS based at least in part on the information.

Clause 70. The UE of clause 69, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 71. The UE of any of clauses 69 to 70, wherein the first resources that are QCLed in the same antenna port as the second resources correspond to less than all resources associated with the second RAT DL RS of the DSS carrier.

Clause 72. The UE of any of clauses 69 to 71, wherein the processing comprises performing measurements of the second RAT DL RS on the first resources without a measurement gap between successive instances of the second RAT DL RS.

Clause 73. The UE of any of clauses 69 to 72, wherein the processing comprises rate-matching on the first resources based on the second RAT DL RS irrespective of whether the UE is configured with a rate-matching pattern associated with the second RAT DL RS.

Clause 74. The UE of any of clauses 69 to 73, wherein the processing comprises adding the second RAT DL RS as an additional RS source ID for one or more of: time and/or frequency tracking, or pathloss estimation, or UE-assisted positioning or UE-based positioning, or reference signal received power (RSRP) measurement, or spatial relation configuration for random access procedures of the first RAT and the second RAT, or radio link monitoring (RLM) measurements, or beam monitoring (BM) measurements, or radio resource management (RRM) measurements, or a combination thereof.

Clause 75. The UE of any of clauses 69 to 74, wherein the processing comprises combining one or more first measurements for the first RAT and one or more second measurements for the second RAT.

Clause 76. The UE of clause 75, wherein the one or more first measurements are associated with: one or more signal synchronization blocks (SSBs), one or more channel state information reference signals (CSI-RSs), one or more tracking reference signals (TRSs) for time, frequency, phase, ranging, positioning or a combination thereof, or a combination thereof.

Clause 77. The UE of any of clauses 75 to 76, wherein the combining comprises defining a transmission power offset between the second RAT DL RS and one or more first RAT signals associated with the one or more first measurements.

Clause 78. The UE of any of clauses 75 to 77, wherein the combining comprises defining one or more L1 and/or L3 filtering coefficients.

Clause 79. The UE of any of clauses 69 to 78, wherein the UE is in a radio resource control (RRC) idle or inactive state during the processing, and wherein the processing comprises using the second RAT DL RS as a tracking reference signal (TRS) for the UE to adjust offsets with respect to the network entity of the second RAT in timing, frequency, phase, ranging, positioning, or a combination thereof.

Clause 80. The UE of clause 79, wherein the information comprises indication of an availability and rate matching pattern of the second RAT DL RS.

Clause 81. A network entity, comprising: means for determining information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and means for transmitting the information to the UE.

Clause 82. The network entity of clause 81, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 83. The network entity of any of clauses 81 to 82, wherein the first resources that are QCLed in the same antenna port as the second resources correspond to less than all resources of the DSS carrier that are associated with the second RAT DL RS.

Clause 84. The network entity of any of clauses 81 to 83, wherein the UE is in a radio resource control (RRC) idle or inactive state when the information is transmitted to the UE.

Clause 85. A non-transitory computer-readable medium storing computer-executable instructions that, when executed by a user equipment (UE), cause the UE to: transmit, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and receive, from the network entity, scheduling information for resources on the DSS carrier based at least in part upon the DSS capability indication.

Clause 86. The non-transitory computer-readable medium of clause 85, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 87. The non-transitory computer-readable medium of any of clauses 85 to 86, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 88. The non-transitory computer-readable medium of any of clauses 85 to 87, wherein the scheduling information allocates to the UE, in a second RAT non-Multimedia Broadcast multicast service Single Frequency Network (non-MBSFN) subframe, one or more symbols for one or more physical channels carrying control information of the first RAT that punctured or rate-matched based on: a second RAT downlink (DL) reference signal (RS), one or more DL control channels of the second RAT, or both.

Clause 89. The non-transitory computer-readable medium of any of clauses 85 to 88, wherein the scheduling information allocates to the UE, in a second RAT non-Multimedia Broadcast multicast service Single Frequency Network (non-MBSFN) subframe, one or more resource elements (REs) for one or more physical channels control information of the first RAT that is punctured or rate-matched based on: a second RAT downlink (DL) reference signal (RS), one or more DL control channels of the second RAT, or both.

Clause 90. The non-transitory computer-readable medium of any of clauses 85 to 89, wherein the UE corresponds to a reduced capability (RedCap) UE, which operates on the DSS carrier and is capable of processing downlink (DL) reference signals (RSs) from the first RAT and the second RAT.

Clause 91. A non-transitory computer-readable medium storing computer-executable instructions that, when executed by a network entity, cause the network entity to: receive, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and transmit scheduling information for resources on the DSS carrier based at least in part upon the DSS capability indication.

Clause 92. The non-transitory computer-readable medium of clause 91, wherein the DSS capability indication indicates: whether processing of second RAT Multimedia Broadcast multicast service Single Frequency Network (MBSFN) subframes is supported by the UE, or at least one supported port configuration associated with a second RAT downlink (DL) reference signal (RS) for a non-MBSFN subframe, wherein the second RAT DL RS is broadcast or multicast to UEs on the DSS carrier, or at least one supported rate matching pattern for the second RAT DL RS, or at least one alternative demodulation reference signal (DMRS) location on the DSS carrier, at least one tracking reference signal (TRS) configuration for time, frequency, phase, ranging, positioning or a combination thereof on the DSS carrier, at least one channel state information reference signal (CSI-RS) on the DSS carrier, or a combination thereof.

Clause 93. The non-transitory computer-readable medium of any of clauses 91 to 92, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 94. The non-transitory computer-readable medium of any of clauses 91 to 93, wherein the scheduling information allocates to the UE, in a second RAT non-Multimedia Broadcast multicast service Single Frequency Network (non-MBSFN) subframe, one or more symbols for one or more physical channels carrying control information of the first RAT that is punctured or rate-matched based on: a second RAT downlink (DL) reference signal (RS), one or more DL control channels of the second RAT, or both.

Clause 95. The non-transitory computer-readable medium of any of clauses 91 to 94, wherein the scheduling information allocates to the UE, in a second RAT non-Multimedia Broadcast multicast service Single Frequency Network (non-MBSFN) subframe, one or more resource elements (REs) for one or more physical channels carrying control information of the first RAT that is punctured or rate-matched based on: a second RAT downlink (DL) reference signal (RS), one or more DL control channels of the second RAT, or both.

Clause 96. The non-transitory computer-readable medium of any of clauses 91 to 95, wherein the UE corresponds to a reduced capability (RedCap) UE.

Clause 97. A non-transitory computer-readable medium storing computer-executable instructions that, when executed by an UE, cause the UE to: receive, from a network entity, information associated with a second radio access technology (RAT) downlink (DL) reference signal (RS) scheduled on first resources of a dynamic spectrum sharing (DSS) carrier on which both first RAT signaling and second RAT signaling are scheduled for the UE, wherein the second RAT DL RS is broadcast or multicast to UEs on the DSS carrier, and wherein the first resources being quasi co-located (QCLed) in the same antenna port as second resources on which one or more first RAT signals for the UE are scheduled; and process the second RAT DL RS based at least in part on the information.

Clause 98. The non-transitory computer-readable medium of clause 97, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 99. The non-transitory computer-readable medium of any of clauses 97 to 98, wherein the first resources that are QCLed in the same antenna port as the second resources correspond to less than all resources associated with the second RAT DL RS of the DSS carrier.

Clause 100. The non-transitory computer-readable medium of any of clauses 97 to 99, wherein the processing comprises performing measurements of the second RAT DL RS on the first resources without a measurement gap between successive instances of the second RAT DL RS.

Clause 101. The non-transitory computer-readable medium of any of clauses 97 to 100, wherein the processing comprises rate-matching on the first resources based on the second RAT DL RS irrespective of whether the UE is configured with a rate-matching pattern associated with the second RAT DL RS.

Clause 102. The non-transitory computer-readable medium of any of clauses 97 to 101, wherein the processing comprises adding the second RAT DL RS as an additional RS source ID for one or more of: time and/or frequency tracking, or pathloss estimation, or UE-assisted positioning or UE-based positioning, or reference signal received power (RSRP) measurement, or spatial relation configuration for random access procedures of the first RAT and the second RAT, or radio link monitoring (RLM) measurements, or beam monitoring (BM) measurements, or radio resource management (RRM) measurements, or a combination thereof.

Clause 103. The non-transitory computer-readable medium of any of clauses 97 to 102, wherein the processing comprises combining one or more first measurements for the first RAT and one or more second measurements for the second RAT.

Clause 104. The non-transitory computer-readable medium of clause 103, wherein the one or more first measurements are associated with: one or more signal synchronization blocks (SSBs), one or more channel state information reference signals (CSI-RSs), one or more tracking reference signals (TRSs) for time, frequency, phase, ranging, positioning or a combination thereof, or a combination thereof.

Clause 105. The non-transitory computer-readable medium of any of clauses 103 to 104, wherein the combining comprises defining a transmission power offset between the second RAT DL RS and one or more first RAT signals associated with the one or more first measurements.

Clause 106. The non-transitory computer-readable medium of any of clauses 103 to 105, wherein the combining comprises defining one or more L1 and/or L3 filtering coefficients.

Clause 107. The non-transitory computer-readable medium of any of clauses 97 to 106, wherein the UE is in a radio resource control (RRC) idle or inactive state during the processing, and wherein the processing comprises using the second RAT DL RS as a tracking reference signal (TRS) for the UE to adjust offsets with respect to the network entity of the second RAT in timing, frequency, phase, ranging, positioning, or a combination thereof.

Clause 108. The non-transitory computer-readable medium of clause 107, wherein the information comprises indication of an availability and rate matching pattern of the second RAT DL RS.

Clause 109. A non-transitory computer-readable medium storing computer-executable instructions that, when executed by a network entity, cause the network entity to: determine information associated with a second radio access technology (RAT) downlink (DL) reference signal (RS) scheduled on first resources of a dynamic spectrum sharing (DSS) carrier on which both first RAT signaling and second RAT signaling are scheduled for a user equipment (UE), wherein the second RAT DL RS is broadcast or multicast to UEs on the DSS carrier, and wherein the first resources being quasi co-located (QCLed) in the same antenna port as second resources on which one or more first RAT signals for the UE are scheduled; and transmit the information to the UE.

Clause 110. The non-transitory computer-readable medium of clause 109, wherein the information comprises: a second RAT cell-specific RS (CRS) pattern, a transmission power offset, a QCL relationship between the second RAT DL RS and first RAT system information (SI) signaling or dedicated radio resource control (RRC) signaling, or a combination thereof.

Clause 111. The non-transitory computer-readable medium of any of clauses 109 to 110, wherein the first resources that are QCLed in the same antenna port as the second resources correspond to less than all resources of the DSS carrier that are associated with the second RAT DL RS.

Clause 112. The non-transitory computer-readable medium of any of clauses 109 to 111, wherein the UE is in a radio resource control (RRC) idle or inactive state when the information is transmitted to the UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
 a memory;
 at least one transceiver; and
 at least one processor communicatively coupled to the memory and the at least one transceiver, the at least one processor configured to:
 transmit, via the at least one transceiver, to a network entity, a dynamic spectrum sharing (DSS) capability indication, wherein the DSS capability indication indicates that the UE supports communications over a DSS carrier on which first radio access technology (RAT) signaling and second RAT signaling are scheduled; and
 receive, via the at least one transceiver, from the network entity, scheduling information for resources on the DSS carrier based at least in part upon the DSS capability indication,
 wherein the DSS capability indication includes:
 an indication of whether processing of second RAT Multimedia Broadcast multicast service Single Frequency Network (MBSFN) subframes is supported by the UE, or
 at least one supported port configuration associated with a second RAT downlink (DL) reference signal (RS) for a non-MBSFN subframe, wherein the second RAT DL RS is broadcast or multicast to UEs on the DSS carrier, or
 at least one alternative demodulation reference signal (DMRS) location on the DSS carrier, or
 at least one tracking reference signal (TRS) configuration for time, frequency, phase, ranging, positioning or a combination thereof on the DSS carrier, or
 at least one channel state information reference signal (CSI-RS) on the DSS carrier, or
 a combination thereof.

2. The UE of claim 1, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on:
 a second RAT downlink (DL) reference signal (RS),
 one or more DL control channels of the second RAT, or both.

3. The UE of claim 1, wherein the scheduling information allocates to the UE, in a second RAT non-Multimedia Broadcast multicast service Single Frequency Network (non-MBSFN) subframe, one or more symbols for one or more physical channels carrying control information of the first RAT that punctured or rate-matched based on:
 a second RAT downlink (DL) reference signal (RS),
 one or more DL control channels of the second RAT, or both.

4. The UE of claim 1, wherein the scheduling information allocates to the UE, in a second RAT non-Multimedia Broadcast multicast service Single Frequency Network (non-MBSFN) subframe, one or more resource elements (REs) for one or more physical channels control information of the first RAT that is punctured or rate-matched based on:
 a second RAT downlink (DL) reference signal (RS),
 one or more DL control channels of the second RAT, or both.

5. The UE of claim 1, wherein the UE corresponds to a reduced capability (RedCap) UE, which operates on the DSS carrier and is capable of processing downlink (DL) reference signals (RSs) from the first RAT and the second RAT.

6. A network entity, comprising:
 a memory;
 at least one transceiver; and
 at least one processor communicatively coupled to the memory and the at least one transceiver, the at least one processor configured to:
 receive, via the at least one transceiver, from a user equipment (UE), an indication of a dynamic spectrum sharing (DSS) capability indication, wherein the DSS capability indication indicates that the UE supports communications over a DSS carrier on which first radio access technology (RAT) signaling and second RAT signaling are scheduled; and
 transmit, via the at least one transceiver, scheduling information for resources on the DSS carrier based at least in part upon the DSS capability indication,
 wherein the DSS capability indication includes:
 an indication of whether processing of second RAT Multimedia Broadcast multicast service Single Frequency Network (MBSFN) subframes is supported by the UE, or
 at least one supported port configuration associated with a second RAT downlink (DL) reference signal (RS) for a non-MBSFN subframe, wherein the second RAT DL RS is broadcast or multicast to UEs on the DSS carrier, or
 at least one alternative demodulation reference signal (DMRS) location on the DSS carrier, or
 at least one tracking reference signal (TRS) configuration for time, frequency, phase, ranging, positioning or a combination thereof on the DSS carrier, or
 at least one channel state information reference signal (CSI-RS) on the DSS carrier, or
 a combination thereof.

7. The network entity of claim 6, wherein the scheduling information allocates to the UE, in a second RAT Multimedia Broadcast multicast service Single Frequency Network (MBSFN) subframe, one or more symbols for one or more physical channels carrying control information of the first RAT that is punctured or rate-matched based on:
 a second RAT downlink (DL) reference signal (RS),
 one or more DL control channels of the second RAT, or both.

8. The network entity of claim 6, wherein the scheduling information allocates to the UE, in a second RAT non-Multimedia Broadcast multicast service Single Frequency Network (non-MBSFN) subframe, one or more symbols for one or more physical channels carrying control information of the first RAT that is punctured or rate-matched based on:
- a second RAT downlink (DL) reference signal (RS),
- one or more DL control channels of the second RAT, or both.

9. The network entity of claim 6, wherein the scheduling information allocates to the UE, in a second RAT non-Multimedia Broadcast multicast service Single Frequency Network (non-MBSFN) subframe, one or more resource elements (REs) for one or more physical channels carrying control information of the first RAT that is punctured or rate-matched based on:
- a second RAT downlink (DL) reference signal (RS),
- one or more DL control channels of the second RAT, or both.

10. The network entity of claim 6, wherein the UE corresponds to a reduced capability (RedCap) UE.

* * * * *